(12) United States Patent
Mayor et al.

(10) Patent No.: US 9,954,420 B2
(45) Date of Patent: Apr. 24, 2018

(54) SYSTEMS AND METHODS FOR DIRECT WINDING COOLING OF ELECTRIC MACHINES

(71) Applicant: Georgia Tech Research Corporation, Atlanta, GA (US)

(72) Inventors: J. Rhett Mayor, Stockbridge, GA (US); S. Andrew Semidey, Atlanta, GA (US)

(*) Notice: Subject to any disclaimer, the term of this patent is extended or adjusted under 35 U.S.C. 154(b) by 0 days.

(21) Appl. No.: 15/071,571

(22) Filed: Mar. 16, 2016

(65) Prior Publication Data
US 2016/0197536 A1    Jul. 7, 2016

Related U.S. Application Data

(63) Continuation of application No. 13/623,023, filed on Sep. 19, 2012, now Pat. No. 9,331,553.

(60) Provisional application No. 61/536,326, filed on Sep. 19, 2011.

(51) Int. Cl.
*H02K 9/19* (2006.01)
*H02K 9/22* (2006.01)

(52) U.S. Cl.
CPC .............. *H02K 9/19* (2013.01); *H02K 9/22* (2013.01)

(58) Field of Classification Search
CPC .................................. H02K 9/19; H02K 9/22
USPC ........................................... 310/54, 58
See application file for complete search history.

(56) References Cited

U.S. PATENT DOCUMENTS

| | | | |
|---|---|---|---|
| 4,213,745 A | 7/1980 | Roberts | |
| 5,513,194 A * | 4/1996 | Tamura | H01S 3/06791 372/18 |
| 6,486,586 B2 | 11/2002 | Higashino et al. | |
| 6,621,185 B2 | 9/2003 | Riess | |
| 8,686,605 B2 | 4/2014 | Takahashi et al. | |
| 2003/0064428 A1* | 4/2003 | Herman | C12M 23/58 435/41 |
| 2005/0012409 A1 | 1/2005 | Philippart | |
| 2005/0151429 A1 | 7/2005 | Taketsuna et al. | |
| 2005/0191186 A1* | 9/2005 | Harris | F04C 2/103 417/205 |
| 2008/0143199 A1 | 6/2008 | Laskaris et al. | |
| 2010/0045125 A1 | 2/2010 | Takenaka et al. | |
| 2010/0102649 A1 | 4/2010 | Cherney et al. | |
| 2010/0102650 A1 | 4/2010 | Eriksen et al. | |
| 2010/0102651 A1 | 4/2010 | Mohle et al. | |
| 2010/0102652 A1 | 4/2010 | Booth et al. | |

(Continued)

*Primary Examiner* — Alex W Mok
(74) *Attorney, Agent, or Firm* — Kundu PLLC

(57) ABSTRACT

A system and method for cooling electric machines using direct winding heat exchangers (DWHX) is disclosed. The system can comprise a plurality of DWHXs disposed in thermal communication with a plurality of copper windings in the stator of an electric machine for cooling the plurality of copper windings. The plurality of DWHXs can also be in fluid communication with one or more fluid manifolds for providing coolant to the plurality of DWHXs. The one or more manifolds can be in fluid communication with one or more heat reservoirs for rejecting the heat absorbed by the plurality of DWHXs. The heat reservoir can be an internal system radiator or an infinite reservoir such as a cooling pond. The method can comprise a design tool for optimizing a DWHX cooling system utilizing the internal system radiator or an infinite reservoir, among other things.

18 Claims, 13 Drawing Sheets

(56) References Cited

U.S. PATENT DOCUMENTS

2010/0176668 A1    7/2010   Murakami et al.
2010/0264760 A1   10/2010   Matsui et al.
2011/0133580 A1    6/2011   Sugimoto et al.
2011/0156509 A1    6/2011   Minemura et al.
2011/0221287 A1    9/2011   Lucchi

* cited by examiner

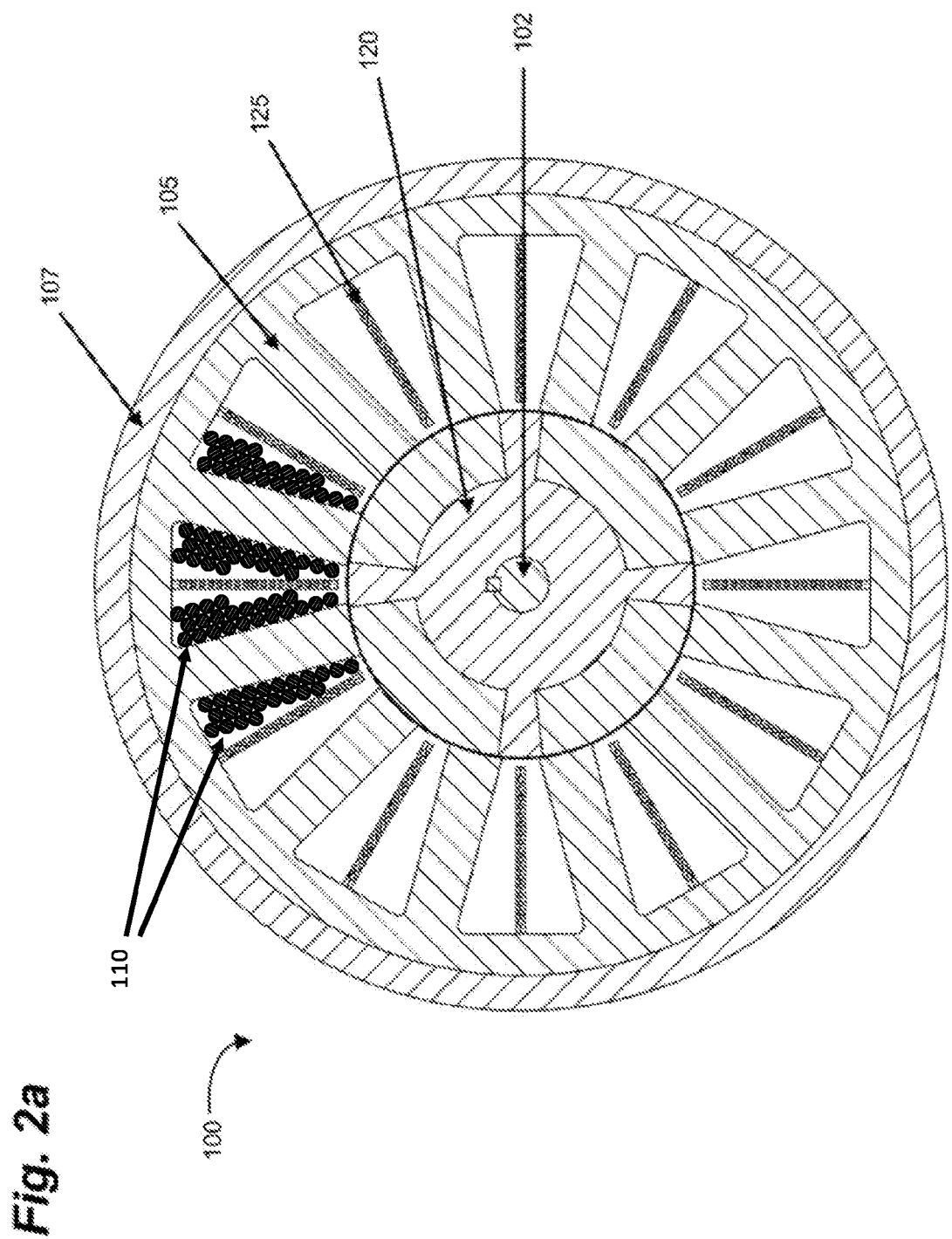

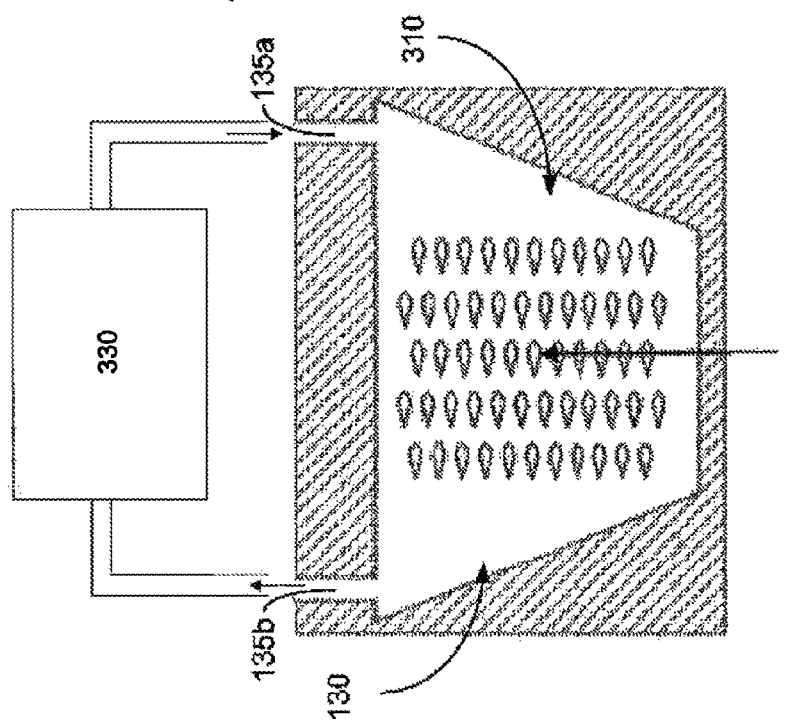
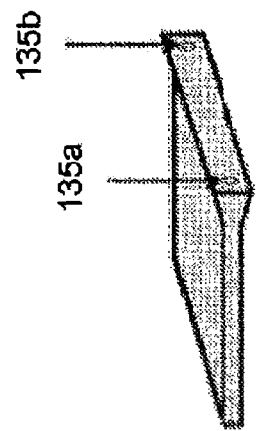
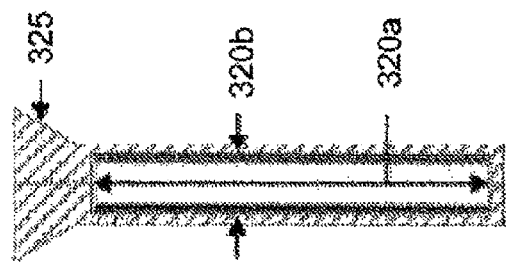
Fig. 3b
Fig. 3c
Fig. 3a

SYSTEMS AND METHODS FOR DIRECT WINDING COOLING OF ELECTRIC MACHINES

CROSS REFERENCE TO RELATED APPLICATIONS

This application is a continuation application, which claims benefit under 35 U.S.C. § 120 of U.S. patent application Ser. No. 13/623,023, filed Sep. 19, 2012, which claims benefit under 35 USC § 119(e) of U.S. Provisional Patent Application Ser. No. 61/536,326, entitled "Direct Winding heat Exchanger" and filed Sep. 19, 2011, all of which are herein incorporated by reference as if fully set forth below in their entireties.

BACKGROUND

1. Technical Field

Embodiments of the present invention relate generally to systems and methods for cooling electric machines, and specifically to cooling electric machines with direct winding cooling.

2. Background of Related Art

The increasing demand for electrical power sources for, for example, hybrid electric vehicle (HEV) and electric vehicle (EV) power trains has created a need for high torque density electric machines. In addition to HEV and EV passenger cars, other applications that require high torque density machines include, for example and not limitation, off road construction equipment, freight trucks, military ships, and electric actuators for flight control surfaces in aircrafts. Currently, a limiting factor for consistent power output is the thermal degradation of the windings. In other words, the heat in the windings caused by generating higher power outputs increases the resistance in the windings, and melts insulation, among other things.

Conventionally, the techniques employed to improve the thermal transport processes in small scale (e.g., less than 100 kW) electrical machines has been focused on improving the internal and external air flow across the electrical machine. Other methods have attempted to improve flow through the machine, but generally rely on conduction to transfer heat from the windings to the stator, reducing efficiency.

Direct lamination cooling (DLC), for example, provides cooling by passing coolant directly through channels in the stator. Unfortunately, this configuration changes the flux paths inside the stator. In addition, DLC primarily removes heat from the stator and, thus, relies on conduction from the windings to the stator to cool the windings. Phase change cooling, utilizing the heat of vaporization of the coolant, has been used for the thermal management of large scale electrical machines (i.e., on the order of several hundred megawatts). Unfortunately, large temperature gradients arise due to the increased heat transfer from evaporative cooling resulting in poor reliability in small scale applications. In addition, the design and implementation of advanced cooling in electric machines in general, and smaller machines in particular, is limited.

What is needed, therefore, is an integrated design tool, system, and method utilizing advanced cooling techniques. In some embodiments, the system should include an integrated thermal model including novel advanced cooling technologies. The integrated, advanced, thermal model can be used in conjunction with optimization techniques to provide improved systems and methods for electric machines with the novel cooling techniques. In some embodiments, the integrated model, in conjunction with optimization techniques, can be used to access system sizing and cooling requirements, among other things.

BRIEF SUMMARY

Embodiments of the present invention relate generally to systems and methods for cooling electric machines, and specifically to cooling electric machines with direct winding cooling. Embodiments of the present invention can comprise a system and method for cooling electric machines using direct winding heat exchangers (DWHX). In some embodiments, the system can comprise a plurality of DWHXs disposed in thermal communication with a plurality of copper windings in the stator of an electric machine for cooling the plurality of copper windings. In some embodiments, the plurality of DWHXs can also be in fluid communication with one or more fluid manifolds, disposed in the stator of the machine, for providing coolant to the plurality of DWHXs. The one or more manifolds can, in turn, be in fluid communication with, for example, one or more heat reservoirs for rejecting the heat absorbed by the plurality of DWHXs. The heat reservoir can be, for example and not limitation, an internal system radiator or an infinite reservoir such as, for example and not limitation, an ocean, lake, or cooling pond.

Embodiments of the present invention can also comprise a method, or design tool, for optimizing a DWHX cooling system utilizing, for example, an internal system radiator or an infinite reservoir. The method can optimize design parameters to provide increased efficiency and torque density. Embodiments of the present invention enable electric machines with significantly increased torque density, while still sufficiently managing winding thermal loads.

Embodiments of the present invention can comprise a system for cooling an electric machine comprising a stator and one or more copper windings. In some embodiments, the system can comprise one or more direct winding heat exchangers (DWHX) thermally coupled to the one or more copper windings. The DWHXs can comprise a coolant reservoir and a plurality of micro-features disposed inside the coolant reservoir. Coolant can then flow through the one or more DWHXs to provide direct cooling to the one or more copper windings.

In some embodiments, the coolant reservoir can comprise a meso-channel and at least one of the plurality of micro-features can comprise a micro-hydrofoil. In some embodiments, the plurality of micro-features can be arranged in a symmetrical array about the centerline of the coolant flow. In some embodiments, the coolant reservoir can be substantially prismatic, and the plurality of micro-features can be disposed only on one or more of the major sides of the coolant reservoir.

In some embodiments, each of the one or more DWHXs can further comprise a dovetail joint for detachably coupling the DWHX to a non-conductive bulkhead. In some embodiments, the system can further comprise a thermally conductive epoxy disposed proximate the one or more DWHXs and the one or more cooper windings for conducting heat therebetween.

Embodiments of the present invention can also comprise a system for cooling an electric machine comprising a stator, one or more end caps, a frame, and one or more copper windings. In some embodiments, the system can comprise one or more direct winding heat exchangers (DWHX) thermally coupled to the one or more copper windings for providing direct cooling to the one or more copper windings, an inlet plenum in fluid communication with the one or more DWHXs for providing coolant to the one or more DWHXs, an outlet plenum in fluid communication with the one or more DWHXs for removing coolant from the one or more DWHXs, and a heat reservoir, in fluid communication with the inlet manifold and outlet manifold, for rejecting heat transferred to the coolant from the one or more DWHXs.

In some embodiments, the inlet plenum and the outlet plenum can be disposed in the one or more side covers. The system can further comprise one or more non-conductive bulkheads for detachably coupling the one or more DWHXs to the electric machine. In some embodiments, the one or more DWHXs can be pressed into the one or more non-conductive bulkheads. In some embodiments, the non-conductive bulkheads can, in turn, be pressed into the frame.

In some embodiments, the heat reservoir can comprise an integral radiator in fluid communication with the inlet plenum and the outlet plenum for shedding heat absorbed by the one or more direct winding heat exchangers (DWHX). In other embodiments, the heat reservoir can comprise a substantially infinite external radiator in fluid communication with the inlet plenum and the outlet plenum for shedding heat absorbed by the one or more direct winding heat exchangers (DWHX). In some embodiments, the profile of each of the plurality of micro-features can be square, round, or rhomboidal.

These and other objects, features and advantages of the present invention will become more apparent upon reading the following specification in conjunction with the accompanying drawing figures.

BRIEF DESCRIPTION OF THE FIGURES

FIG. 2a depicts a cross-sectional view of the DWHX system, in accordance with some embodiments of the present invention.

FIG. 3a depicts a cross-sectional view of a DWHX, in accordance with some embodiments of the present invention.

FIG. 3b depicts a cross-sectional view of a DWHX with micro-features, in accordance with some embodiments of the present invention.

FIG. 3c depicts a perspective view of a DWHX with an inlet and an outlet, in accordance with some embodiments of the present invention.

DETAILED DESCRIPTION

Figure 1:
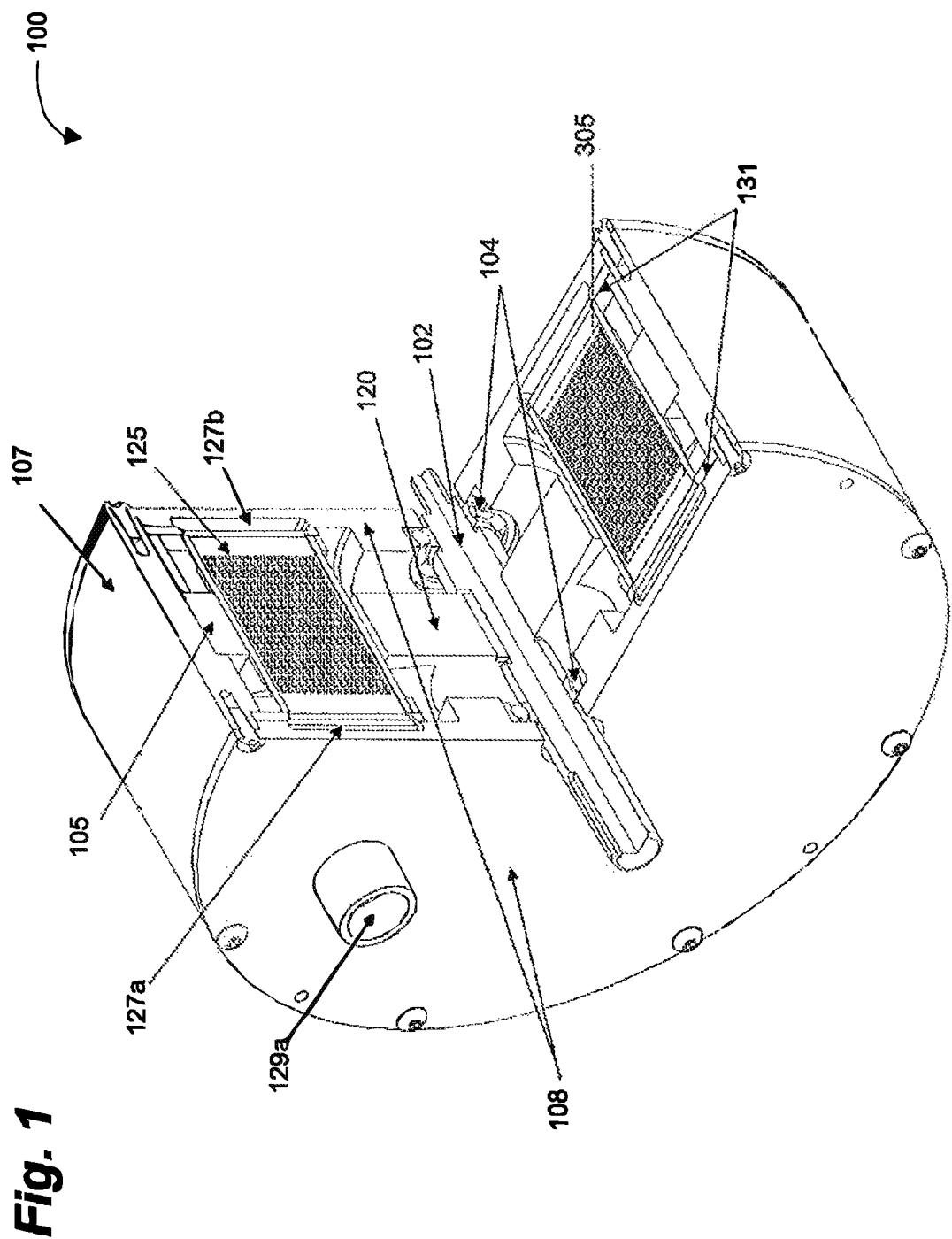
FIG. 1 depicts a sectional view of a direct winding heat exchanger (DWHX) system installed on an electric machine, in accordance with some embodiments of the present invention.

Embodiments of the present invention relate generally to systems and methods for cooling electric machines, and specifically to cooling electric machines with direct winding cooling. Embodiments of the present invention can comprise a system and method for cooling electric machines using direct winding heat exchangers (DWHX). In some embodiments, the system can comprise a plurality of DWHXs disposed in thermal communication with a plurality of copper windings in the stator of an electric machine for cooling the plurality of copper windings. In some embodiments, the plurality of DWHXs can also be in fluid communication with one or more fluid manifolds disposed in the stator of the machine for providing coolant to the plurality of DWHXs. The one or more manifolds can be in fluid communication with, for example, one or more heat reservoirs for rejecting the heat absorbed by the plurality of DWHXs. The heat reservoir can be, for example and not limitation, an internal system radiator or an infinite reservoir such as a cooling pond.

Embodiments of the present invention can also comprise a method, or design tool, for optimizing a DWHX cooling system utilizing, for example, an internal system radiator or an infinite reservoir. The method can optimize design parameters to provide increased efficiency and torque density. Embodiments of the present invention enable electric machines with significantly increased torque density, while still sufficiently managing winding thermal loads.

To simplify and clarify explanation, the system is described below as a system for cooling electric machines and motors. One skilled in the art will recognize, however, that the invention is not so limited. The system can also be deployed for cooling a variety of electric machines comprising concentrating windings such as, for example and not limitation, linear actuators, servomotors, solenoids, transformers, switched and variable reluctance permanent magnet motors, induction motors, and relays.

The materials described hereinafter as making up the various elements of the present invention are intended to be illustrative and not restrictive. Many suitable materials that would perform the same or a similar function as the materials described herein are intended to be embraced within the scope of the invention. The DWHXs are described below as being manufactured from aluminum, for example, but other thermally conductive materials such as, for example and not limitation, copper, silver, gold, platinum, and thermally conductive polymers could be used. Such other materials not described herein can include, but are not limited to, materials that are developed after the time of the development of the invention. Any dimensions listed in the various drawings are for illustrative purposes only and are not intended to be limiting. Other dimensions and proportions are contemplated and intended to be included within the scope of the invention.

As discussed above, a problem with conventional cooling systems for electric machines has been that the systems rely on inefficient methods such as, for example, indirect cooling. In other words, instead of placing the cooling system proximate the windings of a motor, where a majority of the heat is generated, conventional systems have typically relied on indirect cooling through the stator to remove heat from the system. In addition to the inefficiencies that this configuration introduces, the cooling passages in the stator can also affect motor efficiency by changing the magnetic properties of the stator itself.

Figure 2B:
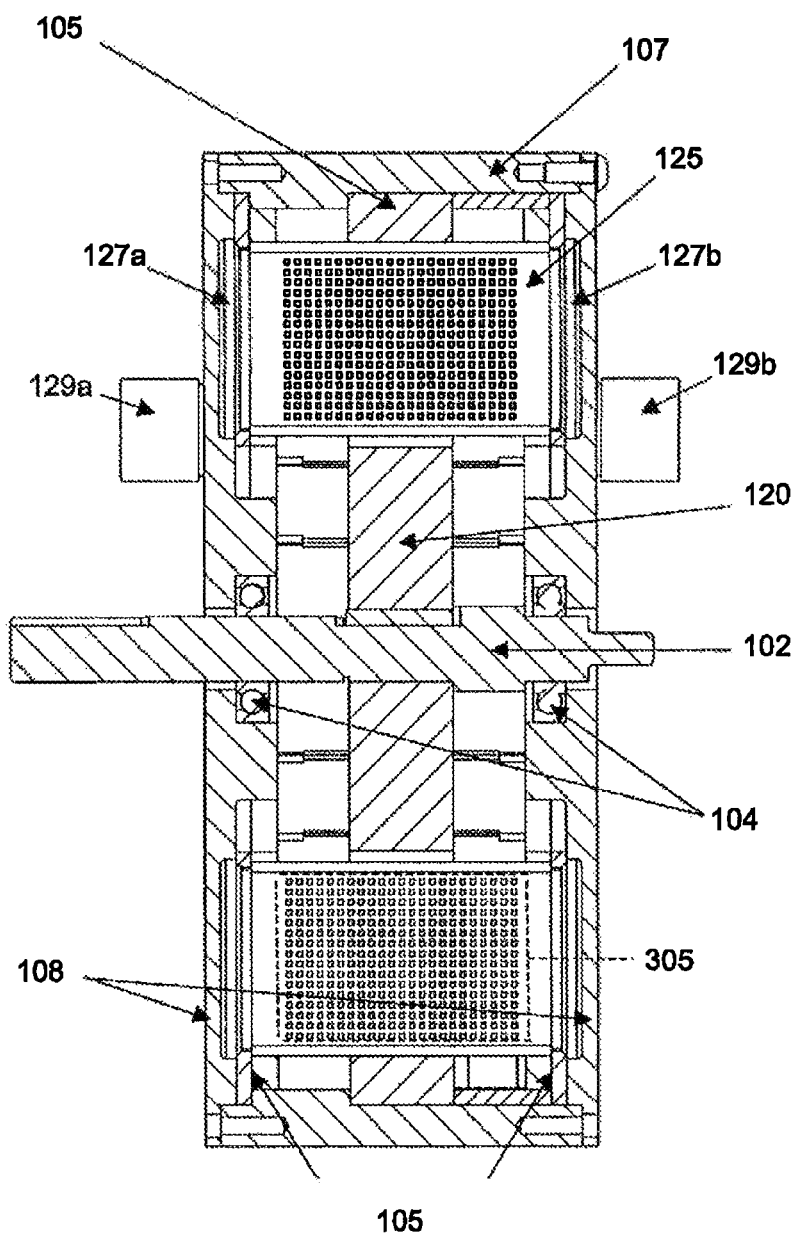
FIG. 2b depicts another cross-sectional view of the DWHX system, in accordance with some embodiments of the present invention.

Embodiments of the present invention, therefore, can comprise a system utilizing an advanced cooling technique comprising heat exchangers disposed proximate the stator windings of an electric machine and a method for designing same. As shown in FIGS. 1-2b, embodiments of the present invention can comprise a direct winding cooling technique comprising a novel enhanced heat exchanger component, or direct winding heat exchanger (DWHX) 125, inserted between the winding bundles 110 on the stator 105 of an electric machine 100.

In high torque density electric machines, for example, the majority of the losses are generated in the windings 110. In conventional machines, this heat is generally dissipated through the stator 105 to the frame 107 of the machine where it is simply rejected into the ambient air. Embodiments of the present invention, on the other hand, enable the heat generated by the windings 110 to be directly transferred into a passing fluid that is in thermal communication with, for example and not limitation, an infinite thermal reservoir or to an integral heat exchanger (e.g., liquid-to-liquid) or radiator (e.g., liquid-to-air). Consequently, the temperature of the windings 110 can be maintained very close to ambient, lowering resistance. This, in turn, enables a substantial increase in current while maintaining the thermal integrity of the windings 110 and insulation, among other things.

As shown in FIGS. 1, 2a and 2b, in some embodiments, the system can comprise an electric machine 100, e.g., a motor or other electric machine with concentrated windings, comprising a shaft 102, one or more bearings 104, stator 105, a plurality of copper windings 110, one or more permanent magnets 115, and a rotor 120. In some embodiments, one or more DWHXs 125 can be disposed in close proximity to, or in direct contact with, the copper windings 110. In this manner the DWHXs 125 can remove heat directly from the copper windings 110 improving efficiency. In some embodiments, the DWHXs 125 can be inserted into conductive filler disposed proximate to, or in contact with, the copper windings 110.

In some embodiments, the DWHXs 125 can be in communication with one or more inlet plenums 127a for providing coolant to the DWHXs 125. The inlet plenum 127a can, in turn, be in fluid communication with a coolant inlet 129 disposed in the end caps 108 of the machine 100 for providing coolant to the machine from, for example, an integral radiator or other coolant source, as discussed below. The DWHXs 125 can also be in communication with one or more outlet plenums 127b and a coolant outlet 129b disposed in the end caps 108 to enable hot coolant to exit the machine 100 for cooling.

In some embodiments, to minimize the effect of the DWHXs 125 on the electromagnetics of the machine 100, the DWHXs 125 can be isolated from the machine 100 with non-conductive bulkheads 131. In some embodiments, for example, the DWHXs 125 can be pressed into the non-conductive bulkheads 131 which, in turn, can be pressed into the frame 107. The fluid plenums 127a, 127b, on the other hand, can be machined directly into the end caps 108, which connect to the fluid loop from the inlet 129a and outlet 129b ports. In this manner, the DWHXs 125 have a minimal effect on the magnetic flux of the machine 100, in general, and the stator 105, in particular.

Embodiments of the present invention can also comprise a system and method for determining the correct sizing and internal channel design for the heat exchanger 125, or DWHX 125. A DWHX 125 with small micro-channels (hydraulic diameter between 0.1-0.5 mm), for example, provides high heat transfer rates due to its increased surface area, but can also produce a significant coolant pressure drop. This pressured drop increases pumping work, which decreases overall system efficiency. A larger meso-channel (hydraulic diameter >0.5 mm), on the other hand, reduces coolant pressure drop, but can dramatically reduces heat transfer rates. The optimal DWHX 125, therefore, should exhibit a low pressure drop, yet maximize heat transfer.

As shown in FIGS. 3a-3c, therefore, in some embodiments, the DWHXs 125 can comprise one or more coolant passages, or meso-channels 130, which illustrate an example of a coolant reservoir. The channels 130 can contain a cooling medium, such as, for example and not limitation, a gas (e.g., air or nitrogen), water, or other liquid coolant (e.g., ethylene glycol). In some embodiments, the cooling medium can be pressurized to, for example, prevent boiling and increase heat rejection. As shown in FIG. 3c, in some embodiments, the DWHX 125 can comprise one or more coolant inlets 135a and outlets 135b. The cooling passages 130 in the DWHX 125 can be optimized for cooling and can be, for example, a simple open reservoir, a loop with an inlet and an outlet, or a serpentine design to increase the surface contact between the heat exchanger 125 and the coolant. Of course, the design of the cooling passage can be customized to the cooling needs of a particular winding 110 or motor 100, as required. In some embodiments, as discussed below, the DWHX 125 can comprise an open meso-channel comprising a plurality of micro-features.

As shown in FIGS. 3a and 3b, embodiments of the present invention can comprise a plurality of micro-feature protrusions 305 disposed inside a meso-channel 130 to enable reduced pressure drop and increased heat transfer. In some embodiments, micro-features 305 can be disposed in an array 310 to improve cooling efficiency over, for example, an empty, or "blank," channel 130. The micro-features 305 can improve the heat rejection provided by the DWHX with reduced increases in pumping losses. The micro-features 305 can comprise a variety of shapes including, for example and not limitation, square, rhomboidal, or round.

In some embodiments, as shown, the micro-features 305 can be airfoil shaped for improved hydrodynamic efficiency. Each flow channel 310 can contain, for example, one or more micro-hydrofoil arrays 305 that are symmetric about the centerline of the flow. These arrays 305 can provide increased thermal performance with reduced pressure drop as compared to, for example, micro-channels. To a large extent, the geometric dimensions of the micro-hydrofoil features 305 determine the heat transfer characteristics and pressure drop, and thus directly affect system performance. Of course, the airfoil shape and array configuration can be changed to suit a particular heat load or channel 130 shape. The effects of different airfoils and array configurations, therefore, are preferably captured in the design model for the DWHX electric machine.

In some embodiments, as shown in FIGS. 3a and 3c, the DWHXs 125 can be substantially a rectangular prism with a major side 320a and a minor side 320b. In some embodiments, the DWHXs 125 can be relative thin and tall to ease installation in the windings 110. In some embodiments, the major sides 320a of the DWHXs 125 can be in contact with the windings 110 to provide increased surface contact area. In other embodiments, the plurality of micro-features can be disposed on one or more of the major sides 320a of the DWHXs 125. This can provide substantial cooling capacity, while reducing manufacturing costs somewhat. In other embodiments, the plurality of micro-features can be disposed on one or more of the major sides 320a, the minor sides 320b, or both of the DWHXs 125.

In some embodiments, the DWHXs 125 can further comprise a dovetail joint 325 for connecting the DWHXs 125 to, for example, the non-conductive bulkheads 131. The dovetail joint 325 can enable the DWHXs 125 to be retained in the non-conductive bulkheads 131 and can provide some alignment, if necessary, between the inlet 135a and outlet 135b of the DWHX 125 and the inlet 127a and outlet 127b plenums. In other embodiments, the DWHXs 125 can be, for example and not limitation, pressed, soldered, welded, or adhered into the non-conductive bulkheads 131.

Dissipating the heat collected in the fluid from the windings 110 is also a challenge in the design of a DWHX electric machine. In some embodiments, the plurality of DWHXs can be in fluid communication with one or more fluid manifolds disposed in the stator of the machine for providing coolant to the plurality of DWHXs. The one or more manifolds can be in fluid communication with, for example, one or more heat reservoirs 330 for rejecting the heat absorbed by the plurality of DWHXs. The heat reservoir 330 can be, for example and not limitation, an internal system radiator or an infinite reservoir such as a cooling pond. As a further example, the heat rejection can be done with an air-to-water radiator, as in an automobile. In this case, the size of the radiator required depends on the temperature of the fluid, the temperature of the ambient air, the flow rate of the fluid, and the flow rate of cooling air over the radiator, among other things. In other words, increasing the fluid temperature and dropping the flow rate decreases the size of the radiator. If the fluid temperature is too high, however, the fluid could boil, creating system instabilities. In some embodiments, therefore, radiator sizing can be included in the design model as well.

Similarly, pump sizing can be an important design issue. A lower flow rate, for example, requires less pumping work leading to a smaller pump. Under these conditions, however, the lower flow rate could again cause, for example, coolant boiling and system instabilities (e.g., overheating). Conversely, while a large pump (and consequently, large flow rate) reduces system temperatures. The larger pump also increases system size and energy consumption. Embodiments of the present invention, therefore, can address DWHX and feature design, radiator sizing, and pump sizing in an integrated model that balances heat dissipation and pumping losses to provide an optimized system.

Thermal Design

Figure 4:
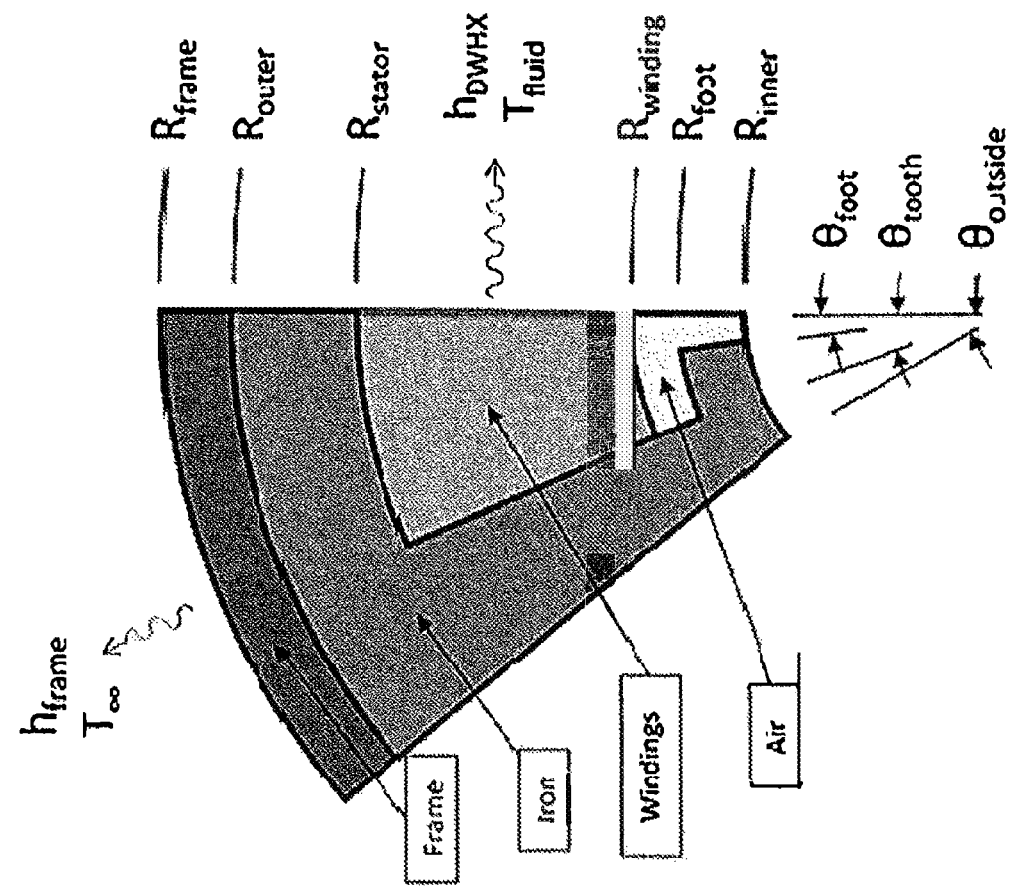
FIG. 4 depicts a thermal modeling approach for a parametric half-slot model of the stator with nine geometric parameters, in accordance with some embodiments of the present invention.

In some embodiments, a parametric, self-meshing, finite-difference (FD) technique can be used to model the spatial thermal response of electric machines. The parametric technique can calculate, numerically, the temperature distribution throughout a one-half slot model of the stator. In some embodiments, this technique can begin by distributing calculation nodes throughout a simplified stator geometry, as seen in FIG. 4, using a "center node" distribution approach expressed in polar coordinates. In some embodiments, an automated segmentation approach can then capture the geometry of the stator teeth 405, back iron 410, windings 415, and estimated air 420 resulting from under fill in the windings.

Many stator geometries nonetheless have features that do not correspond to either a radius or an angle in polar coordinates. In some embodiments, therefore, to create a generic model, the system can represent the actual slot geometry by features that do correspond to either a radius or an angle. This enables any slot geometry to be fully described in a parametric manner using only the nine dimensions (i.e., $R_{frame}$, $R_{outer}$, $R_{stator}$, $R_{winding}$, $R_{foot}$, $R_{inner}$, $\theta_{foot}$, $\theta_{tooth}$, and $\theta_{outside}$) as shown in FIG. 4b. The model mesh can then be generated and segmented according to these parametric descriptors for the actual stator slot geometry. The method of conversion between actual stator slot geometry and the parametric parameters is known.[1]

[1] J. R. Mayor and S. A. Semidey, "Generic electric machine thermal model development using an automated finite difference approach," 2009 IEEE International Electric Machines and Drives Conference, 2009, pp. 137-143, incorporated herein by reference.

In some embodiments, an energy conservation equation can be written for each node that accounts for substantially all energy entering, exiting, generated, and stored in the node. These equations can then be solved simultaneously using matrix inversion to determine the approximate temperature at each node. In some embodiments, based on this information, the DWHX 125 can be modeled as a convective boundary condition. The convective model can then be applied at the boundary of the windings in the half slot model as illustrated in FIG. 4. The temperature of the fluid can be assumed to be the maximum temperature in the fluid loop, while the heat transfer coefficient of the DWHX 125 can be calculated using systems and methods detailed below.

DWHX Selection

The selection of the DWHX geometries, including DWHX micro-feature geometries, is an important part in the design of a DWHX electric machine. The micro-features can be relatively simple shapes such as, for example and not limitation, round, square, or rhomboidal. A rhomboidal shape may be useful, for example, because it is relatively efficient hydrodynamically when compared to, for example, a simple square stud, but is nonetheless relatively simple to manufacture (i.e., it is simply a square turned approximately 45 degrees).

In some embodiments, for improved efficiency, the individual micro-features can be one or more different micro-hydrofoils. Hydrofoils can be used to improve hydrodynamic efficiency and reduce pumping losses, at the cost of somewhat higher manufacturing complexity. In some embodiments, the appropriate hydrofoil (e.g., a NACA 0040 hydrofoil, or similar) can be used and can be described by the characteristic polynomial for the particular hydrofoil. Of course, the type, size, number, and configuration of hydrofoils can be designed to fit a variety of applications.

As shown in FIGS. 5a and 5b, the hydrofoil array, on the other hand, can be described by the transverse spacing ($S_t$), longitudinal spacing ($S_L$), characteristic length ($L_f$), feature height ($H_f$), and channel height ($H_{ch}$). These geometric relationships can be manipulated to alter thermal performance. A dense packing of micro-features, for example, tends to produce high heat transfer characteristics, but also causes significant coolant pressure drop. Conversely, using a relatively low number of micro-features may not sufficiently improve the heat transfer over a meso-channel alone (i.e., one with no micro-features).

In some embodiments, therefore, a definition of DWHX efficiency can be used to assess the tradeoff of between heat transfer and pressure drop. This definition compares the thermal and flow performance of a micro-hydrofoil enhanced DWHX to a DWHX with a meso-channel of the same dimensions, but with no micro-features (i.e., a "blank" channel). This formulation is shown in (1):

$$\eta_{DWHX} = \frac{h_{hydrofoil}}{h_{blank}} + \frac{\Delta p_{blank}}{\Delta p_{hydrofoil}} \quad (1)$$

where, $h_{hydrofoil}$ and $h_{blank}$ are the heat transfer coefficients of the micro-hydrofoil array and the blank meso-channel, respectively. While, $\Delta p_{blank}$ and $\Delta p_{hydrofoil}$ are the pressure drops of the micro-hydrofoil array and the blank meso-channel, respectively. Thus, (2) enables the analysis of the tradeoff between cooling capacity and pumping losses to arrive at an optimized solution for a particular application.

Cooling Capacity Design

As discussed above, the cooling capacity of the DWHX increases with the number of micro-features, as do the pumping losses. As a result, an optimized solution, which provides improved cooling capacity and reduced pumping losses, exists for a given set of criterion. These criterion may change substantially, however, depending on application. The cooling system for an electric motorcycle, for example, maybe volume and efficiency limited. In other words, a motorcycle provides limited space for the electric machine and requires good efficiency to provide useable range. A nuclear powered naval ship, on the other hand, has fewer space restraints and basically unlimited power and cooling capacity. As a result, for an attack ship, for example, outright power and speed may trump space and/or energy efficiency.

The convective heat transfer coefficient for the nominal blank meso-channel, $h_{blank}$ can be calculated using a standard Nusselt (Nu) correlation for rectangular flow geometries using (2):

$$h_{blank} = \frac{Nu \cdot k_{fluid}}{D_{h,blank}} \quad (2)$$

where, Nu is the Nusselt number for the meso-channel, $k_{fluid}$ is the thermal conductivity of the fluid, and $D_{h,blank}$ is the hydraulic diameter of the meso-channel. The hydraulic diameter of the meso-channel can be shown by (3):

$$D_{h,blank} = \frac{4 \cdot H_{ch} \cdot W_{ch}}{2 \cdot H_{ch} + 2 \cdot W_{ch}} \quad (3)$$

where, $H_{ch}$ is the height of the meso-channel and $W_{ch}$ is the width of the meso-channel. The height of the meso-channel can be calculated from (4):

$$H_{ch} = t_{DWHX} - 2 \cdot t_{wall} \quad (4)$$

where, $t_{DWHX}$ is the overall thickness of the DWHX and $t_{wall}$ is the wall thickness of the DWHX. Both of these values can be specified by the designer based on manufacturing and related design considerations. The pressure drop of the blank meso-channel can be calculated using the Hagen-Poiseuille description of pressure drop through a rectangular channel as shown in (5):

$$\Delta p_{blank} = \frac{L \cdot 12 \cdot \mu \cdot \dot{V}}{H_{ch}^3 \cdot W_{ch}} \quad (5)$$

where, L is the length of the flow channel in the flow direction, $\mu$ is the dynamic viscosity, and $\dot{V}$ is the volumetric flow rate through the channel. The heat transfer coefficient for the micro-hydrofoil arrays is shown in (6):

$$h_{hydrofoil} = \frac{Nu_{hydrofoil} \cdot k_{fluid}}{D_{h,hydrofoil}} \quad (6)$$

Figure 5:
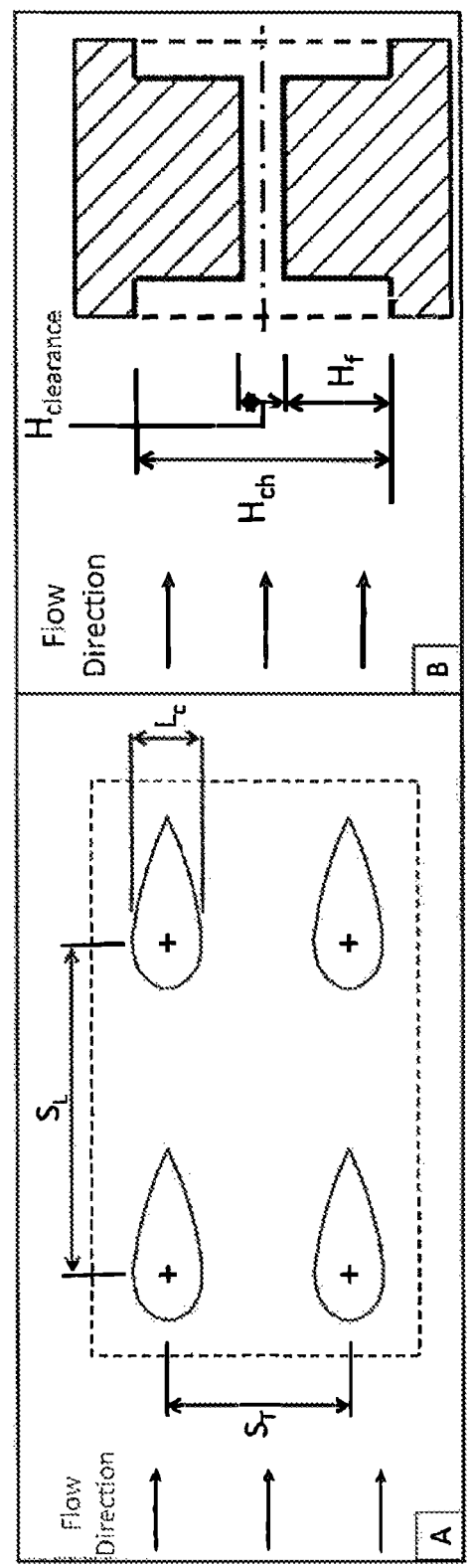
FIG. 5 depicts dimension parameters of a micro-hydrofoil array for use with the system, in accordance with some embodiments of the present invention.

The Nusselt number associated with the micro-hydrofoil arrays can be calculated using the known correlations of the hydrofoil characteristics including, $S_t$, $S_l$, $H_f$, and $L_c$, as shown in FIG. 5 and the Reynolds number, Re, for the micro-hydrofoil array as defined in (7):

$$Re = \frac{\dot{V} \cdot D_{h,hydrofoil} \cdot \rho_{fluid}}{A_{c,features} \cdot \mu_{fluid}} \quad (7)$$

where, $\rho_{fluid}$ is the density of the fluid.

The hydraulic diameter of the micro-hydrofoil array is defined in (8) and the cross sectional area of the micro-hydrofoil arrays in the flow direction is defined in (9):

$$D_{h,hydrofoil} = \frac{4(H_{ch} \cdot W_{ch} - L_c \cdot H_f \cdot N_f)}{2 \cdot H_{ch} + 2 \cdot W_{ch} + 2 \cdot H_f \cdot N_{f,t}} \quad (8)$$

where, $N_{f,t}$ is the number of micro-hydrofoil features in the transverse direction.

$$A_{c,features} = H_{ch} \cdot W_{ch} - L_c \cdot H_f \cdot N_{f,t} \quad (9)$$

The pressure drop across the micro-hydrofoil array is shown in (10):

$$\Delta p_{hydrofoil} = \frac{L \cdot f^*}{D_{h,hydrofoil}} \cdot \frac{1}{2} \cdot \rho_{fluid} \cdot v^2 \quad (10)$$

where, v is the mean velocity defined as the volumetric flow rate divided by the cross sectional area of the micro-hydrofoil array in the flow direction. As with the Nusselt number, the friction factor, f*, can be calculated using known correlations.

The optimal set of micro-hydrofoil array geometries ($S_t/L_c$, $S_l/L_c$, and $H_f/L_c$) maximizes the DWHX efficiency, as defined in (1). Embodiments of the present invention, therefore, can comprise first evaluating the efficiency of all geometry sets that are feasible. Feasibility of a geometry set can be first defined by the feasible ratios of $S_t/L_c$, $S_l/L_c$, and $H_f/L_c$. The feasible ratios can then be defined as the applicable range of the correlations. The ranges tested herein are shown in Table 1:

TABLE 1

Feasible Micro-Hydrofoil Array Geometric Ratios

| Ratios | Min Value | Max Value |
|---|---|---|
| $S_t/L_c$ | 1 | 3 |
| $S_l/L_c$ | 3 | 5 |
| $H_f/L_c$ | 1 | 2.5 |
| $L_c$ [mm] | 0.2 | 1 | which are representative ratios relatively in the middle of reasonable ranges for ease of testing. Of course, these ratios are exemplary only and larger ratios are possible. The range for $S_t/L_c$ can be, for example and not limitation, between at least 1 and 5. The range for $S_l/L_c$ can be, for example and not limitation, between at least 2 and 6. The range for $H_f/L_c$ can be, for example and not limitation, between 1 and 10, or larger. Similarly, $L_c$ can be, for example and not limitation, between 0.1 mm and 2 mm.

In some embodiments, the feasibility of the feature height and longitudinal spacing can be accessed next. In a preferred embodiment, the height of the features is preferably no larger than half of the channel height to avoid, for example and not limitation, vertical interference of the features in an aligned array. In a staggered array, on the other hand, the vertical height variation can create a vertical disturbance to the fluid that may impart additional flow losses. In addition, the longitudinal spacing, $S_l$, is preferably large enough to prevent the hydrofoils from overlapping in the longitudinal direction. These two constraints are shown in (11) and (12), respectively.

$$H_f < \frac{H_{ch}}{2} \quad (11)$$

$$S_l > c + S_t - L_c \quad (12)$$

where c is the length of the chord of the hydrofoil (i.e., the characteristic length divided by the thickness ratio).

The efficiency of each feasible geometry set can then be calculated. Following this calculation, the maximum efficiency from the all feasible geometry sets can be identified. The geometry set with the maximum efficiency can then be determined. The thickness of the DWHX, $t_{DWHX}$, and the thickness of the wall, $t_{wall}$, are determined by the designer based on electromagnetic design and manufacturing considerations, as discussed below.

Pumping Power

Figure 6:
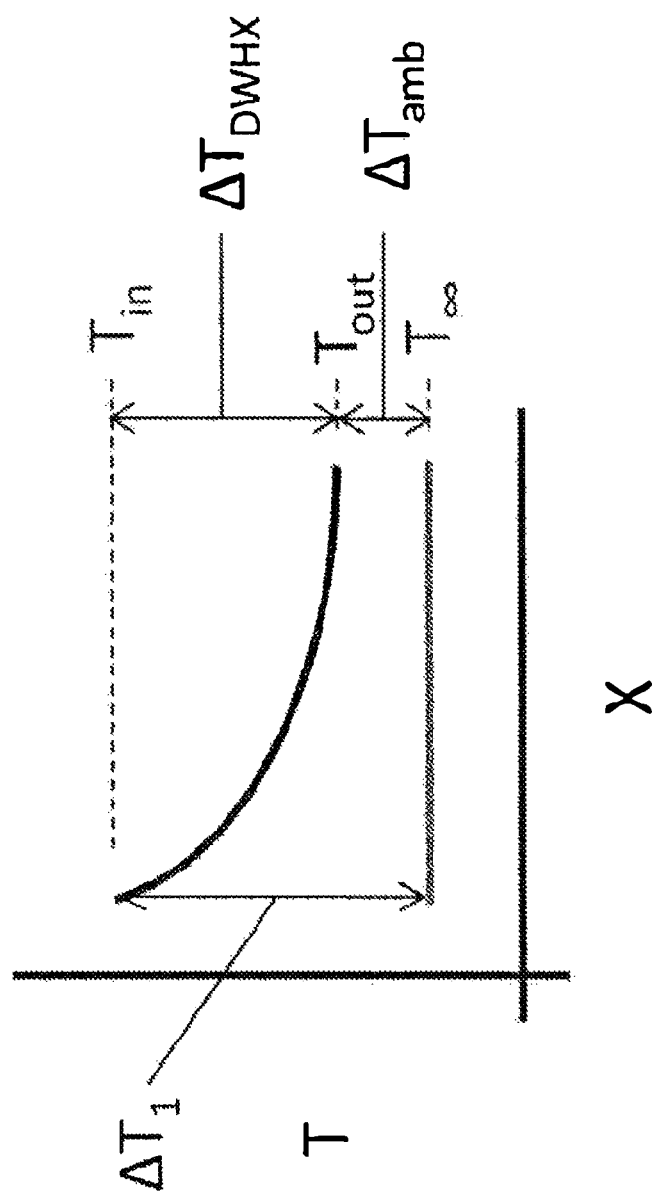
FIG. 6 is a graph depicting a fluid temperature profile across a radiator with a fixed ambient temperature, in accordance with some embodiments of the present invention.

The volume of the radiator and the pump is another important system design component. The temperature drop across the radiator is illustrated in FIG. 6. As shown, the fluid temperature approaches the ambient temperature as the fluid travels along the length of the radiator. At steady state, assuming proper radiator sizing, the temperature drop across the radiator is equal to the temperature rise across the DWHXs in the machine. The temperature rise across the DWHXs in the machine is a function of the loss in the machine and the flow rate through the system. Ideally, of course, the radiator should provide the required cooling capacity at the minimum pumping loss. For ease of calculation, and to provide a margin of safety, the maximum fluid temperature in the DWHXs, therefore, is considered to be the inlet temperature to the radiator.

A convenient way to define the size of the radiator is by specifying two temperature differences. The first is the temperature difference from the outlet of the radiator to the ambient temperature, $\Delta T_{amb}$. The second is the temperature increase across the DWHXs, $\Delta T_{DWHX}$. From $\Delta T_{DWHX}$, the mass flow rate through the system can be calculated using (13).

$$\dot{m} = \frac{P_{copper}}{C_{p,fluid} \Delta T_{DWHX}} \quad (13)$$

where, $c_{p,fluid}$ is the specific heat of the fluid. Of course, this formulation assumes that all of the copper loss, $P_{copper}$, goes into heating the fluid. For a specific example, one can use manufacturer's data regarding the thermal resistance per unit volume of the radiator can be calculated from mass flow rate as shown in (14):

$$R''_{rad} = 0.0199 \cdot \exp(-21.437 \cdot \dot{m}) + 0.03898 \quad (14)$$

which can be derived empirically from, for example, experimental or manufacturer's data[2] for a particular forced cooled air exchanger, for example. Of course, other types of heat sinks such as different radiators or heat exchangers can be similarly derived. The volume of the radiator can then be calculated using (15):

$$V_{rad} = \frac{P_{copper} \cdot R'''_{rad}}{\Delta T_{lm}} \quad (15)$$

where the log mean temperature, $\Delta T_{lm}$, is defined in (16):

$$\Delta T_{lm} = \frac{(T_{out} - T_\infty) - (T_{in} - T_\infty)}{\ln((T_{out} - T_\infty)/(T_{in} - T_\infty))} \quad (16)$$

where, the inlet and the outlet temperatures are defined in (17) and (18), respectively:

$$T_{in} = T_\infty + \Delta T_{DWHX} \quad (17)$$

$$T_{out} = T_\infty + \Delta T_{amb} \quad (18)$$

where $T_\infty$ is the ambient temperature. The size of the pump is a linear function of the required pumping power as defined in (19):

$$V_{pump} = 8.8642e-4 \cdot P_{pump} \quad (19)$$

which, like (14) can also be derived empirically from, for example, experimental or manufacturer's data. Of course, as with radiators, pumps of different types and sizes can be separately derived and the calculations provided herein are intended to be purely illustrative. In some embodiments, the pumping power can be calculated using (20):

$$P_{pump} = \frac{\dot{V} \cdot \Delta p}{\eta_{pump}} \quad (20)$$

where $\Delta p$ is the pressure drop through the system and $\eta_{pump}$ is the efficiency of the pump. The pressure drop through the system can then calculated using (21):

$$\Delta p = (\Delta p_{rad} + \Delta p_{DWHX} \cdot Nm) \cdot \eta_{minor} \quad (21)$$

where $\Delta p_{rad}$ is the pressure drop through the radiator, Nm is the number of stator slots, and $\eta_{minor}$ is the minor loss coefficient. In other words, the coefficient accounts for substantially all of the minor pressure losses through the system. Similarly, the pressure drop through the radiator is calculated using (22):

$$\Delta p_{rad} = (0.1314 \cdot (60.3 \cdot \dot{m})^2 + 0.501) \cdot V_{rad} \qquad (22)$$

which, as before, was derived from manufacturer's data.

[2] In this case, the formula was derived from manufacturer's data. See, "MCRX20-QP Radiator Series", Rouchon Industries, Inc. (2012), available at http://www.swiftech.com/MCRX20-QP-RADIATOR-SERIES.aspx#tab2

These equations tend to indicate that the volume of the radiator and pump are largely functions of $\Delta T_{amb}$, $\Delta T_{DWHX}$, and $T_\infty$, where $T_\infty$ is a constraint based on the specification of the designer.

Method for Optimization of Design

The electromagnetics of an electric machine require the selection of a variety of design parameters such as, for example and not limitation, stator bore diameter, air gap length, and slot fill factor. As discussed above, the thermal design of the electric machine, on the other hand, requires the selection of, among other things, ambient temperature, the thickness of the DWHX, DWHX wall thickness, and the temperature differences $\Delta T_{amb}$ and $\Delta T_{DWHX}$. The ambient temperature, $T_\infty$, for example, can be selected by the designer based on desired operating conditions. This can be based on, for example and not limitation, the desired installation location, material properties, or desired output. In other words, $T_\infty$ can be chosen to prevent, for example and not limitation, coolant boiling, burns to users, overheating of the electric machine in a confined space, or to prevent winding, stator, or frame meltdown.

As mentioned above, the selection of DWHX thickness and wall thickness, on the other hand, are based largely on design choices based largely on the manufacturability of the heat exchanger and/or electromagnetic considerations. Electromagnetically, the optimal DWHX would have minimal thickness. Thus, the thicknesses are preferably minimized based on manufacturability and/or durability. $\Delta T_{amb}$ and $\Delta T_{DWHX}$ are parameters that can significantly affect system size and, thus, are preferably optimized.

Figure 7:
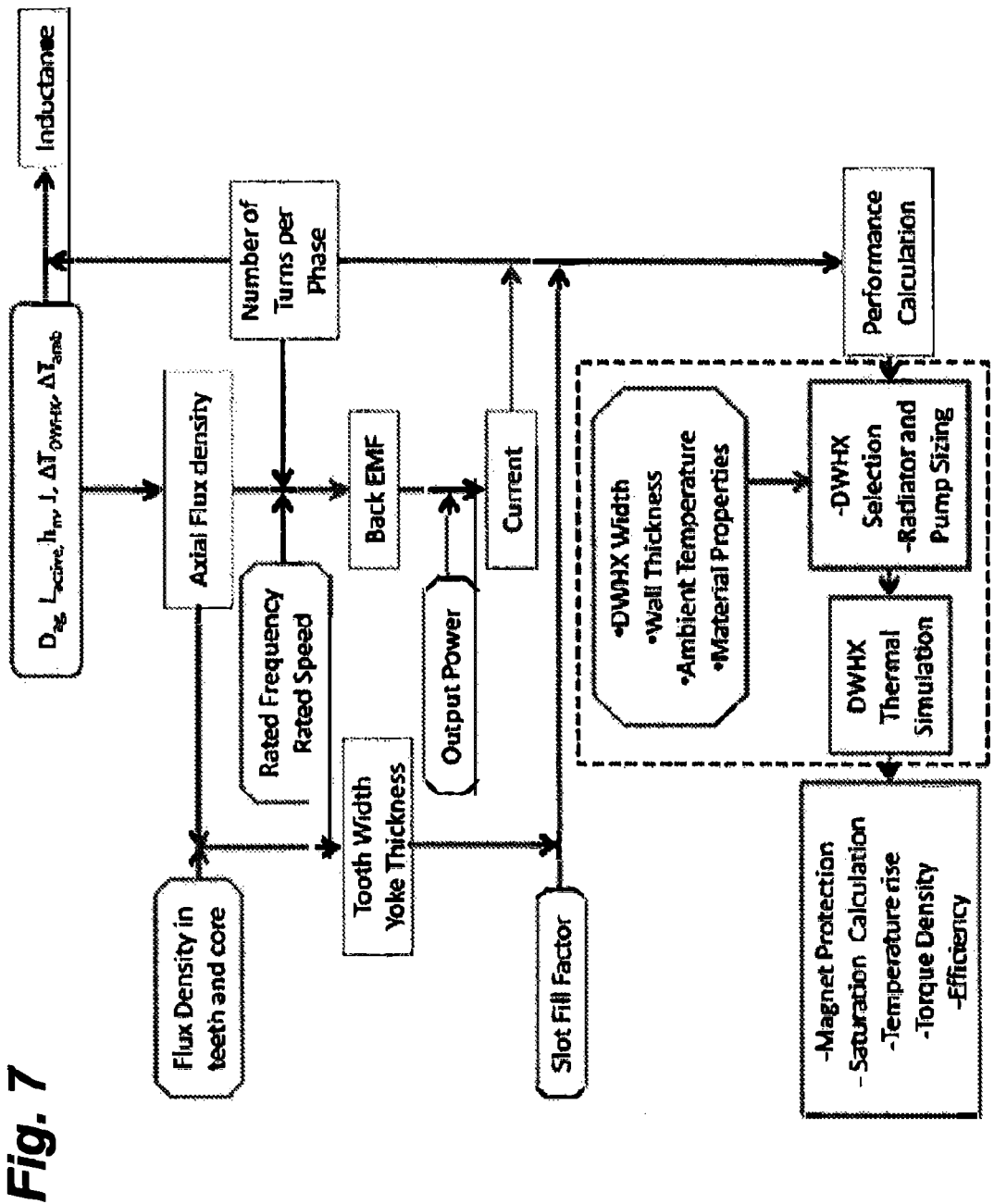
FIG. 7 is a flowchart depicting an integrated design tool for a DWHX system, in accordance with some embodiments of the present invention.

Embodiments of the present invention, therefore, can comprise an integrated design tool. An integrated design simulation is illustrated in FIG. 7. The integrated model includes inputs and outputs 710a, 710b; optimization constraints 705a, 705b, 705c, 705d (i.e., constraints that are determined by the designer); DWHX, radiator, and pump sizing modules 715; and the DWHX electric machines thermal simulation 720. The integrated model also includes a system thermal simulation 725.

Optimization can begin with the formulation of an objective function. The objective function can be determined based on design parameters for the electric machine. In some embodiments, such as in a racing application, the electric machine can be optimized for maximum output. For use in an EV, on the other hand, the electric machine can be optimized to minimize volume and/or maximize efficiency (e.g., range).

In some embodiments, the fitness function can maximize torque density. The fitness function for torque density, f, can be derived as shown in (23). This formulation considers the tradeoff between torque density (Nm/L) and system efficiency, among other things:

$$f = \left(1 - \frac{\rho_{torque}}{\rho^*_{torque}}\right) \cdot 100 + (1 - \eta_{system}) \cdot 100 + \phi_{tot} \qquad (23)$$

where $\rho^*_{torque}$ is a desired torque density, $\rho_{torque}$ is the torque density if the system, $\eta_{system}$ is the system efficiency, and $\phi_{tot}$ is the sum of all penalties. The torque density of the system, therefore, can be defined in (24):

$$\rho_{torque} = \frac{T}{V_{rad} + V_{pump} + V_{motor}} \qquad (24)$$

where T is the torque produced by the machine. The system efficiency can be calculated using (25):

$$\eta_{system} = \frac{P_{out}}{P_{out} + P_{pump} + P_{core} + P_{copper}} \qquad (25)$$

where $P_{out}$ is the designed output power and $P_{core}$ is the core loss. The penalties can be calculated using (26):

$$\phi_{tot} = 10,000(\phi_{sat} + \phi_{dmgr} + \phi_{dmgs} + \phi_{temp}) \qquad (26)$$

where $\phi_{sat}$ is the penalty for armature reaction, $\phi_{dmgr}$ is the penalty for demagnetization at a rated condition, $\phi_{dmgs}$ is the penalty for demagnetization for a shorted condition, and $\phi_{temp}$ is the penalty for insulation life.[3] The penalty function for temperature rise can be defined as:

$$\phi_{temp} = \max\left(\frac{L_{EX} - L_T}{L_{EX}}, 0\right) \qquad (27)$$

where $L_{EX}$ is the expected winding insulation life. As shown in FIG. 8, for example, if a class B winding insulation is used and the expected insulation life is 20,000 hours, the value of $\phi_{temp}$ is plotted where $L_T$ is defined by (28):

$$L_T = 10000 \cdot 10^{-0.03(T-140)} \qquad (28)$$

where T is the maximum insulation temperature for the thermal simulation. Of course, the fitness function would be different for a different set of criterion (e.g., absolute power or maximum efficiency) and is contemplated herein.

[3] The formulation of these penalties can be found in: S. A. Semidey, D. Yao, J. R. Mayor, R. G. Harley, and T. G. Habetler, "Optimal Electromagnetic-Thermo-Mechanical Integrated Design Candidate Search and Selection for Surface-Mount Permanent-Magnet Machines Considering Load Profiles," Industry Applications, IEEE Transactions on, vol. 47, pp. 2460-2468, 2011, incorporated herein by reference.

Optimization Case Studies

Two case studies were performed to assess sizing of a DWHX electric machine. The first case study, or integrated radiator case study, was used to understand the tradeoffs between motor sizing and radiator sizing. This analysis could be useful for determining a system for optimizing torque within a specific volume, for example. The second case study, or infinite reservoir case study, was performed to assess the size of the DWHX electric machine when considering an infinite thermal reservoir such as, for example and not limitation, a cooling pond, river, or the ocean. This could be useful in applications, such as offshore racing boats, where ultimate power is the goal, as opposed to efficiency, and there is an essentially limitless heat sink (e.g., the ocean or a lake).

Implementation of Optimization Technique

The integrated model can be combined with an optimization technique to perform case studies. Several nonlinear global optimization techniques can be used to find the optimal DWHX electric machine geometries such as, for example and not limitation, simulated annealing, evolutionary algorithms, and branch and bound. Due to the nonlinearity of the electromagnetics of electric machines and some discontinuous variables for describing same, potential optimization techniques may be somewhat limited to techniques such as, for example and not limitation, particle swarm optimization (PSO) and genetic algorithms (GA), though PSO provides a slight advantage to GA is some cases.

Optimization Specs

The specifications for the DWHX electric machine in each case study are summarized in Table 2:

TABLE 2

DWHX Electric Machine Specification List

| Specification | Value | Units |
| --- | --- | --- |
| Power | 20 | kW |
| Speed | 3600 | RPM |
| Torque | 53 | N-m |
| Voltage | 240 | VAC |
| $T_{inf}$ | 25 | C |
| Desired Torque Density | 10 | N-m/L |
| Frame Material | Aluminum | — |

The key specifications for this case are 20 kW of power at 53 N-m with an ambient temperature of 25° C. Several key parameters can be determined by the designer as previously identified. The constraints used in the two case studies are presented in Table 3:

TABLE 3

DWHX electric machine optimization constraints

| Constraints | Value | Units |
| --- | --- | --- |
| $t_{wall}$ | 0.5 | mm |
| $t_{DWHX}$ | 2 | mm |
| $t_{frame}$ | 3 | mm |
| $k_{windings}$ | 32.5 | W/m-k |
| Contact Resistance | 0.001 | m²-K/W |
| Fill Factor | 0.75 | — |
| Number of Poles | 4 | — |
| Slots per phase per pole | 1 | — |
| Air Gap Length | 0.4 | mm |
| Saturation | 2.4 | T |

The first five constraints are thermal-mechanical constraints. The wall and overall thickness of the DWHX were set based on known micro-manufacturing limits.

Frame Thickness

Figure 8A:
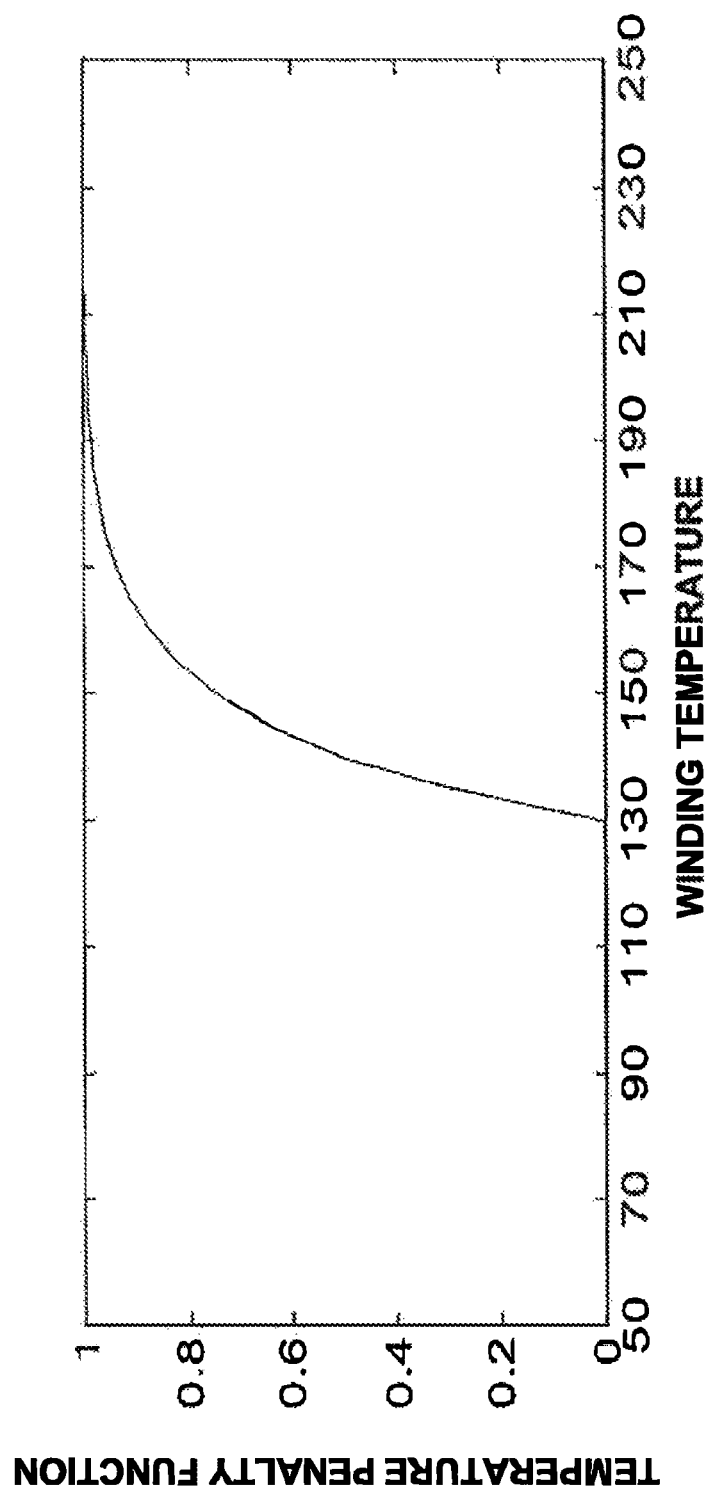
FIG. 8a is a graph depicting winding temperature vs. temperature penalty function, in accordance with some embodiments of the present invention.
Figure 8B:
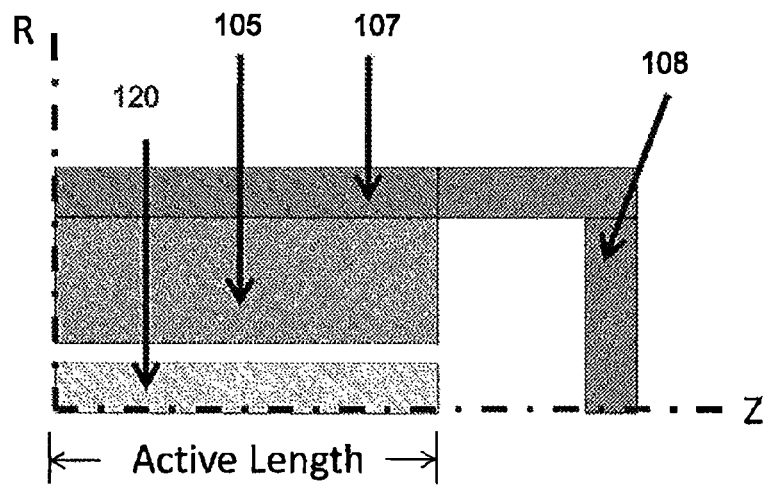
FIG. 8b is a diagram of an electric machine frame with respect to active length, in accordance with some embodiments of the present invention.

In some embodiments, the thickness of the frame can be used to increase the ambient rejection area of the machine. A two dimensional approach for the frame thickness can simplify the required computation, but to maintain the accuracy of the model, the three-dimensional thermal effects are preferably captured. In other words, as shown in FIG. 8b, the model should account for heat transfer in the Z direction as well as the R direction. The most significant heat transfer in the Z direction, therefore, takes place in the frame.

In addition, also as shown in FIG. 8b, the frame area of the machine is significantly larger than the active length area (i.e., the area approximated by the stator and rotor) and thus is preferably accounted for in the boundary condition for the two dimensional model. Unfortunately, a straight area multiplier would lead to over prediction of cooling capabilities because the temperature along the frame is not uniform (i.e., it is higher along the active length). It is more accurate, therefore, to describe the frame as a fin, or triangle, which tends to account for the temperature drop from left to right (as shown) across the frame.

Figure 8C:
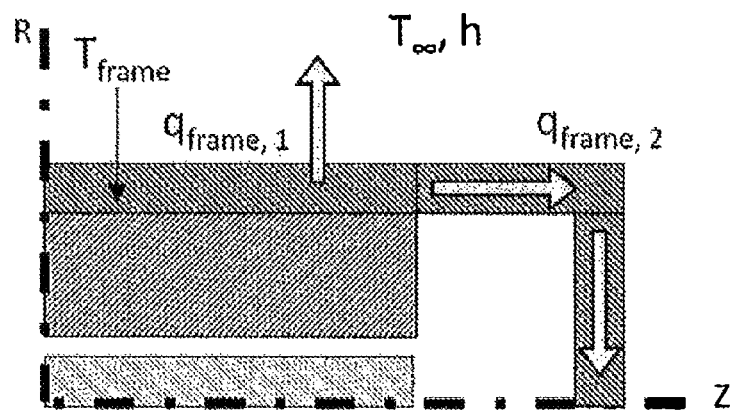
FIG. 8c is a diagram of heat flow in an electric machine frame, in accordance with some embodiments of the present invention.
Figure 8D:
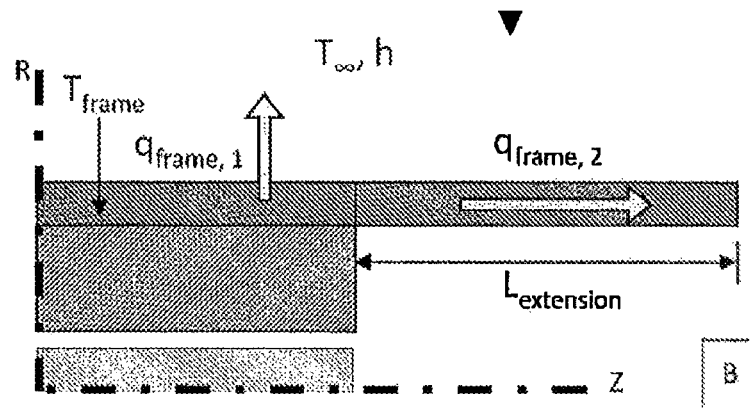
FIG. 8d is a diagram of an electric machine frame with an equivalent frame extension, in accordance with some embodiments of the present invention.

The heat flow through the frame of the machine can be illustrated as in FIG. 8c. Notice that there are two heat flows. The first heat flow is from the active length and the second into the end caps, which can be represented as an extension of the frame, $L_{extension}$, as seen in FIG. 8d. $L_{extension}$ can now be modeled as an annular fin and the temperature drop across $L_{extension}$ can be accounted for using classic fin theory.

Figure 8E:
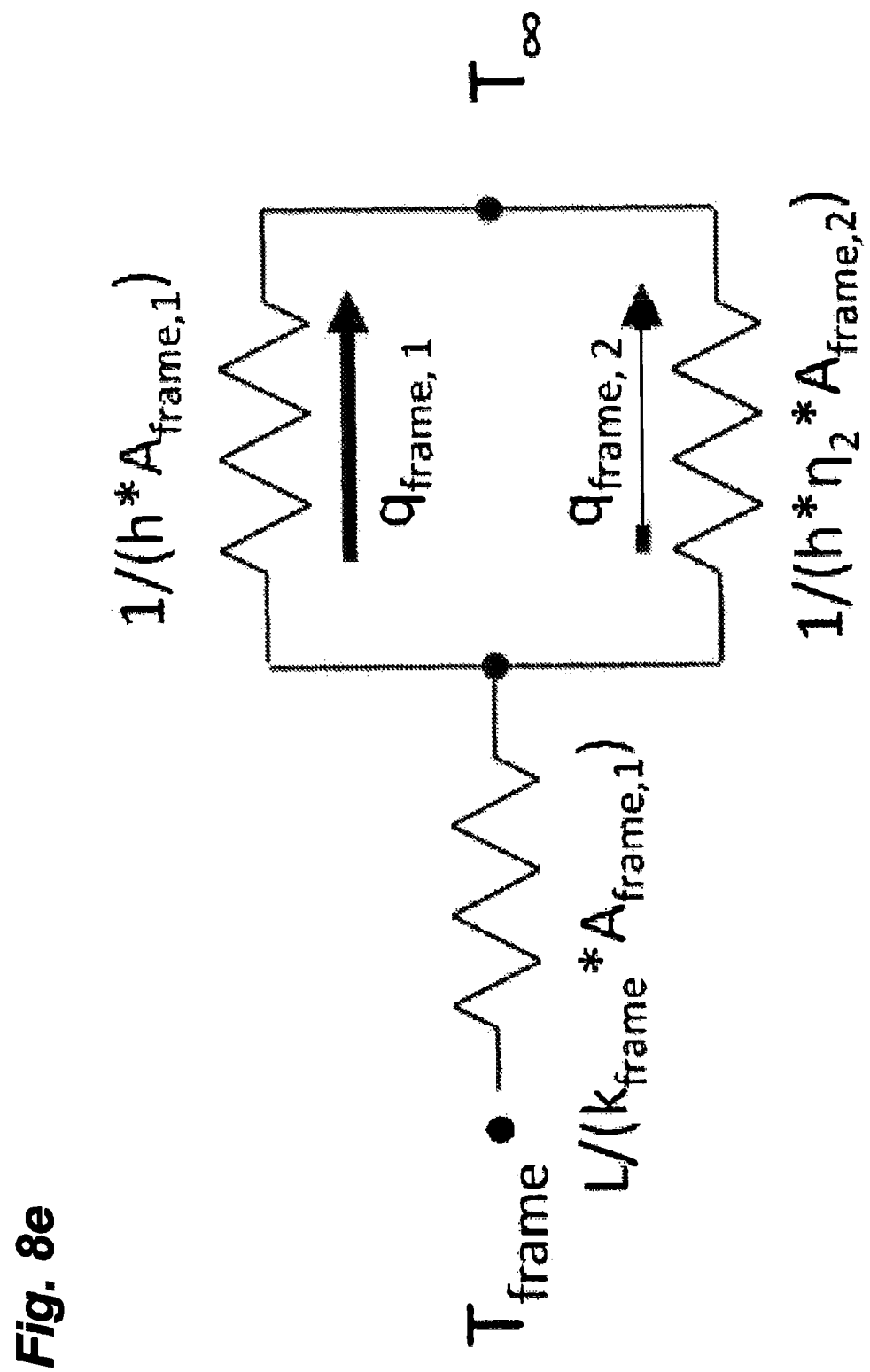
FIG. 8e is a schematic of a thermal circuit for the frame of an electric machine frame, in accordance with some embodiments of the present invention.

The heat flow through the frame, therefore, can be represented as a thermal circuit as seen in FIG. 8e. Notice that in FIG. 8e the second heat flow has a fin efficiency associated with the $L_{extension}$. The efficiency accounts for the temperature drop along the length of the fin. Fin efficiency can be calculated using standard analytical solutions. The thermal circuit can then be solved and applied as a thermal resistance boundary condition thus accounting for the frame three-dimensional effects.

Frame capacitance, therefore, can be represented by (29):

$$\hat{\rho}_{frame} = \frac{m_{tot,frame}}{V_{frame,active\,length}} \quad (29)$$

In other embodiments, because of the cooling capabilities of the DWHX electric machine, the extra cooling area for the frame is not needed. As a result, the frame thickness can simply be set by known manufacturing limits such as, for example and not limitation, material strength or thermal properties.

Windings

Generally, the effective thermal conductivity of the windings is low (<1 W/m-k) because of a low thermal conductivity filler material (e.g., air). For the case studies, however, a filler material of thermally conductive epoxy is used with a thermal conductivity of 5 W/m-k. Of course, other thermally conductive materials could be used and are contemplated herein. This enables a relatively high packing factor of approximately 0.75. The contact resistance between the heat exchanger and the coil can be set as a conservative estimate from typical values.

The optimization variables are discussed above. The optimization variable domains used in the case studies are presented in Table 4:

TABLE 4

DWHX electric machine optimization domain

| Variable | Domain | Units |
| --- | --- | --- |
| D | 30-100 | mm |
| L | 30-100 | mm |
| $h_m$ | 5-15 | mm |
| J | 5-30 | A/mm² |
| $\Delta T_{DWHX}$ | .1-110 | ° C. |
| $\Delta T_{amb}$ | 10-110 | ° C. |

Note that the current densities in conventional electric machines typically range from approximately 3-12 A/mm², but the DWHX cooling technique enables much higher current densities. The domain for the height of the magnets was set based on typical magnet sizes.

Example 1—Integrated Radiator

In many applications, the total system volume is critical. This can be due to, for example and not limitation, size or weight constraints, power requirements, or cost. A propulsion system for an electric car or motorcycle, for example, is preferably powerful, efficient, and relatively small. As a result, the electromagnetic, total motor, radiator, and pump volume all should be considered. This case study was performed, therefore, to understand the tradeoffs between total motor volume, radiator volume, total system volume, and torque. This tradeoff can be conveniently assessed using torque density, or the amount of torque available per unit volume.

In this case study, the temperature difference from the outlet of the radiator to the ambient ($\Delta T_{amb}$) was fixed between 10° C. and 110° C. An optimization was then performed at the fixed $\Delta T_{amb}$ and the other optimization variables were optimized. This was performed for a range of $\Delta T_{amb}$ starting at 10° C. and ending at 110° C. The optimization was replicated three times for each $\Delta T_{amb}$ to ensure the optimal solution was found. The results from the case study are displayed in FIG. 9, which shows the volume on the left hand axis and the efficiency on the right hand axis for each fixed $\Delta T_{amb}$.

Figure 9:
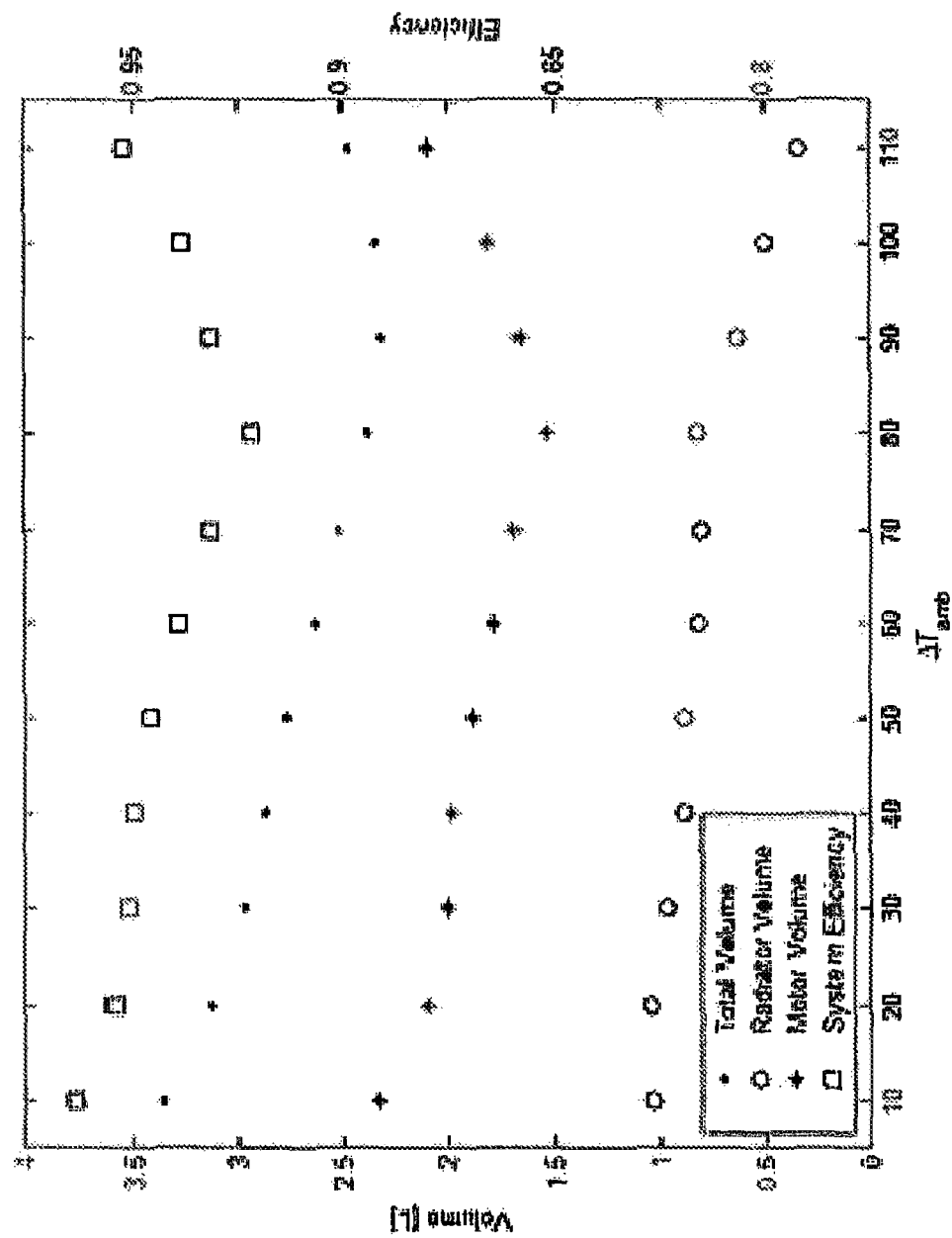
FIG. 9 is a graph depicting volume and efficiency vs. change in ambient temperature ($\Delta T_{amb}$) for an initial sizing case study, in accordance with some embodiments of the present invention.

As shown in FIG. 9, as $\Delta T_{amb}$ increases, the system volume decreases until $\Delta T_{amb}$ reaches 100° C., at which time the system volume begins to increase. It should be noted that the driving force for radiator heat rejection is $\Delta T_{lm}$, which was defined in (18), and the inlet temperature to the radiator is determined by the thermal limit of the windings. As $\Delta T_{amb}$ increases, therefore, $\Delta T_{lm}$ increases until the thermal limit of the windings is reached leading to the inflection at 100° C. Also, notice the radiator volume is a weak function of $\Delta T_{amb}$ between 10° C. and 80° C. and the efficiency of the machine trends with the volume of the motor, as expected.

The fitness function values for each of the optimization trials are shown in Table 5:

As shown, the optimal DWHX electric machine based on the constraints and fitness function previously defined is located at a $\Delta T_{lm}$ of 90° C. At this condition the torque density of the system is 23.2 N-m/l and the torque density based on electromagnetic volume is 66.8 N-m/L. Note that the maximum torque density based on electromagnetic volume is 72.5 N-m/L and happens at a $\Delta T_{lm}$ of 80° C. At this condition, however, the radiator is 33% larger than at the optimal condition. Also, notice that the current densities range from 6.7 to 14.1 A/mm$^2$, which is much higher than for conventional electric machines. The optimization also found high torque density solutions at normal current densities, however, which indicates an increase in overall efficiency. In other words, decreasing the efficiency increases thermal losses, thus increasing radiator volume. For all optimizations the optimal magnet thickness was 15 mm, which could be increased, but may approach manufacturing limits.

The optimal micro-hydrofoil array characteristic dimensions for the optimal DWHX electric machine in this case study are presented in Table 7:

TABLE 7

Optimal Micro-Hydrofoil Geometries for Best Case in initial sizing case study

| | |
|---|---|
| $\Delta T_{amb}$ | 90 |
| $S_l/L_c$ | 2.3 |
| $S_t/L_c$ | 5 |

TABLE 5

Fitness Function values for each trial in radiator case study

| | $\Delta T_{amb}$ | | | | | | | | | | |
|---|---|---|---|---|---|---|---|---|---|---|---|
| Trial # | 10 | 20 | 30 | 40 | 50 | 60 | 70 | 80 | 90 | 100 | 110 |
| | | | | | | Fitness Function Value | | | | | |
| 1 | −55.8 | −66.6 | −75.9 | −83.0 | −88.4 | −97.1 | −107.8 | −112.7 | −124.9 | −123.1 | −112.8 |
| 2 | −55.1 | −66.7 | −75.9 | −83.1 | −88.4 | −98.3 | −104.8 | −117.4 | −124.9 | −123.1 | −110.5 |
| 3 | −55.7 | −66.7 | −75.8 | −82.1 | −88.4 | −98.3 | −107.3 | −117.4 | −123.9 | −123.1 | −111.8 |

The optimization was run several times to ensure the global minimum was reached. For each of the optimization trials the fitness function was within three points of the other trials.

The result from each optimization for the best case for each is displayed in Table 6:

TABLE 7-continued

Optimal Micro-Hydrofoil Geometries for Best Case in initial sizing case study

| | |
|---|---|
| $H/L_c$ | 2.5 |
| $L_c$ | 0.2 |

TABLE 6

Optimization Results for all cases from the $\Delta T_{amb}$ initial sizing case study

| | $\Delta T_{amb}$ | | | | | | | | | | |
|---|---|---|---|---|---|---|---|---|---|---|---|
| | 10 | 20 | 30 | 40 | 50 | 60 | 70 | 80 | 90 | 100 | 110 |
| D [mm] | 87.9 | 85.6 | 86.1 | 86.2 | 87.2 | 87.7 | 84.6 | 85.9 | 88.5 | 81.1 | 83.5 |
| L [mm] | 38.9 | 40 | 37.5 | 36.6 | 33.5 | 30.8 | 34.5 | 30 | 27.7 | 40 | 40.9 |
| J [A/mm2] | 6.7 | 9.1 | 8.7 | 10 | 10.1 | 10.4 | 13.5 | 14.1 | 9.6 | 12.7 | 10 |
| $\Delta T$DWHX | 104.3 | 89.1 | 76.6 | 65.8 | 52.2 | 2 | 2.2 | 2.6 | 2.2 | 1.7 | 1.2 |
| EM Torque Density [N-m/L] | 47.4 | 53.1 | 55.4 | 55.9 | 59.0 | 62.5 | 66.1 | 72.5 | 66.8 | 61.6 | 53.2 |
| Total Torque Density [N-m/L] | 15.9 | 17.1 | 18.1 | 18.7 | 19.4 | 20.4 | 21.3 | 22.5 | 23.2 | 22.9 | 21.8 |
| Efficiency | 0.96 | 0.95 | 0.95 | 0.95 | 0.95 | 0.94 | 0.93 | 0.92 | 0.93 | 0.94 | 0.95 |
| Fitness Value | −55.8 | −66.6 | −75.9 | −83.0 | −88.4 | −98.3 | −107.8 | −117.4 | −124.9 | −123.1 | −112.8 |

TABLE 7-continued

Optimal Micro-Hydrofoil Geometries for Best Case in initial sizing case study

| | |
|---|---|
| $N_{f,t}$ | 61 |
| $N_{f,l}$ | 27 |

These geometries can be used to make the optimal micro-hydrofoil array for the specific machine identified by the optimization.

Example 2—Infinite Reservoir

In some applications, it may be practical to have a substantially infinite thermal reservoir built into the system such as, for example, building water, a cooling pond, or external water cooling (e.g., using intake water from a lake or ocean on a ship). The second case study, therefore, optimizes a DWHX electric machine for substantially infinite reservoir applications. This can be useful in situations where power and speed outweigh efficiency to a certain extent such as, for example and not limitation, offshore racing boats or Navy fast attack ships.

The infinite thermal reservoir can be modeled simply by fixing the fluid temperature of the DWHX to the temperature of the infinite reservoir. The objective function can then be changed to consider only the volume of the motor without regard to the volume of the pump and radiator. The two temperatures that were simulated are 20° C. and 90° C. These temperatures are typical for a large body of water and engine coolant, respectively. The results for each trial of the infinite reservoir study are shown in Table 8:

TABLE 8

Fitness Function values for each trial in Infinite Reservoir Case Study

| | $T_{fluid}$ | |
|---|---|---|
| | 20 | 90 |
| Trial # | Fitness Function Value | |
| 1 | −381.0 | −289.1 |
| 2 | −377.5 | −289.5 |
| 3 | −377.3 | −288.7 |

Again, the optimization was performed three times to ensure the global minimum was reached. In this case study the fitness function was within four points of the other trials. The results from this case study are presented in Table 9:

TABLE 9

Optimization Results for Infinite Reservoir Case study

| | $T_{fluid}$ | |
|---|---|---|
| | 20 | 90 |
| D [mm] | 72.6 | 70.4 |
| L [mm] | 27.6 | 34 |
| J [A/mm²] | 25.9 | 20 |
| EM Torque Density [N-m/L] | 105.7 | 82.9 |
| System Torque Density [N-m/L] | 48.9 | 38.4 |
| Efficiency | 83.2 | 88.7 |
| Fitness Value | −376.62 | −289.67 |

The torque density based on motor volume is 48.9 N-m/L and 38.4 N-m/L for a fluid temperature of 20° C. and 90° C., respectively. The torque density based on electromagnetic volume is 105.7 N-m/L and 82.9 N-m/L for a fluid temperature of 20° C. and 90° C., respectively. 105.7 N-m/L is a significant achievement for current density. Notice that the current density of 25.9 and 20 A/mm², respectively, is significantly higher than typically current densities. Also, notice that the efficiencies are somewhat lower than the integrated radiator case, for example, at 83.2 and 88.7 respectively. The optimization finds these higher current densities because it does not consider the extra heat rejection required by the resulting inefficiencies due to the ability of the infinite reservoir to reject basically limitless amounts of heat. This optimization provides for maximum power, yet still provides relatively good efficiency. For comparison, a typical internal combustion engine struggles to achieve 30% efficiency.

The optimal micro-hydrofoil array characteristic dimensions for this case study are presented in Table 10:

TABLE 10

Optimal Micro-Hydrofoil Geometries for Infinite Reservoir Case study

| | $T_{fluid}$ | |
|---|---|---|
| | 20 | 90 |
| $S_t/L_c$ | 2.2 | 2.2 |
| $S_l/L_c$ | 5 | 5 |
| $H/L_c$ | 2.5 | 2.5 |
| $L_c$ | 0.2 | 0.2 |
| $N_{f,t}$ | 47 | 51 |
| $N_{f,l}$ | 27 | 33 |

In both case studies, the form factor of the electric machine was a "pancake style." In other words, the depth of the machine was much smaller than its diameter. Also, as mentioned above, in the infinite reservoir study, the machine efficiencies were much lower than in the initial sizing case study. The lower efficiencies are expected, however, because DWHX electric machines when coupled to an infinite reservoir of cooling medium at a low temperature achieve such marked improvements in cooling performance that more current can be forced into the winding leading to, simultaneously, extraordinary torque density and a slightly diminished efficiency due to the increased thermal loss from the winding at the higher current levels. Typical machines could not sustain operation under similar current loadings.

As a result, in the initial sizing case studies the optimization found solutions that were much more efficient due to the included radiator sizing. In other words, lower efficiencies produce more heat that the radiator must reject, which leads to larger radiators. To satisfy the tradeoff between motor volume and radiator volume, therefore, the optimization found motors with higher efficiencies. In the infinite reservoir case, on the other hand, because the infinite reservoir can reject large amounts of heat, less efficient, but higher current, solutions were found. Using the method described herein, the fitness can be revised to, for example, minimize volume, mass, or other parameters, as desired.

Figure 10:
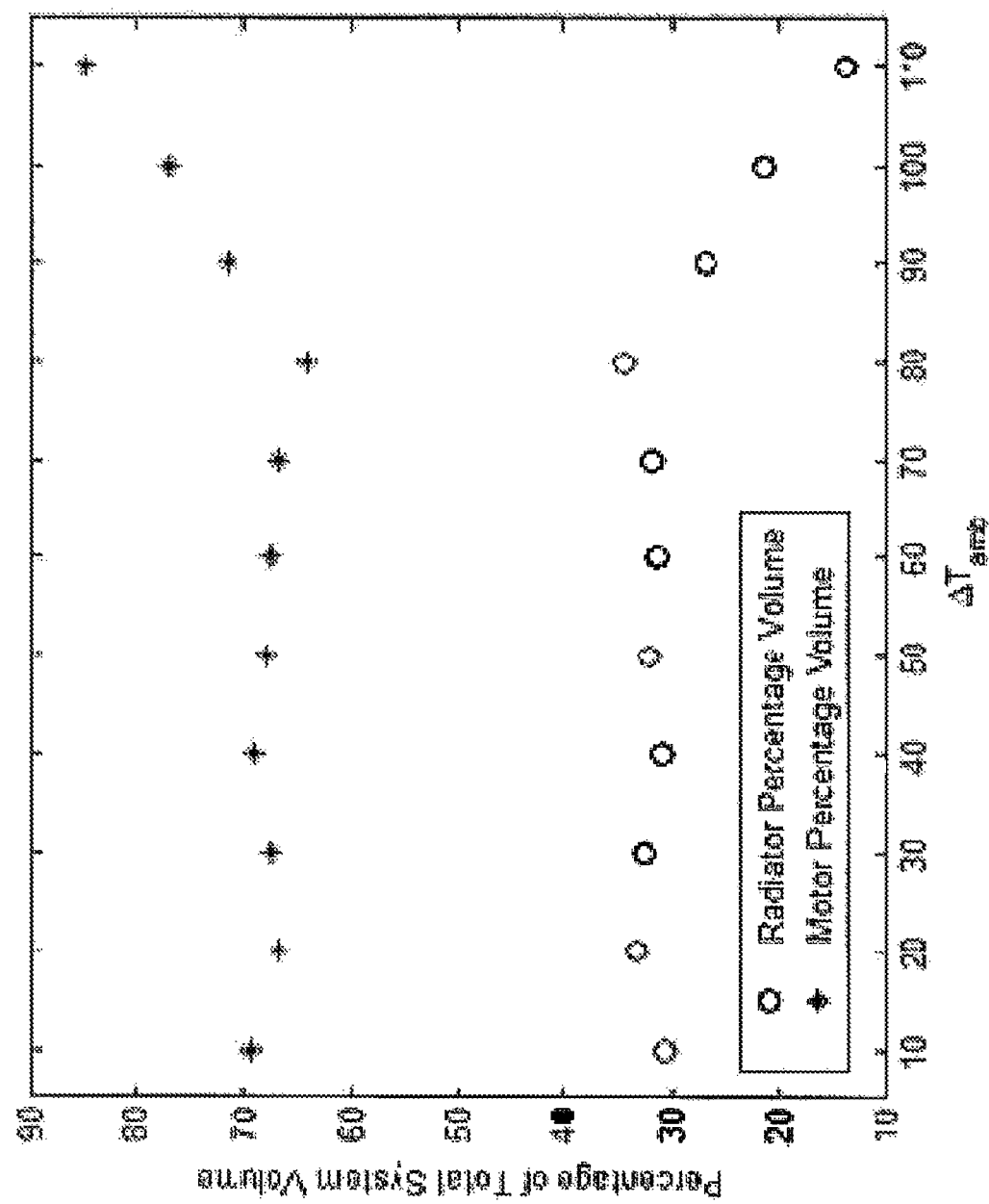
FIG. 10 is a graph depicting percentage motor and radiator volume of total system volume against $\Delta T_{amb}$ for the initial sizing case study, in accordance with some embodiments of the present invention.

In the initial sizing study the radiator volume was a weak function of $\Delta T_{amb}$ between 10° C. and 80° C. The results are replotted and normalized against total system volume and displayed in FIG. 10. Notice that the percentage volume of total system volume is a weak function of $\Delta T_{amb}$ between 10° C. and 80° C. indicating an optimal ratio of motor volume to radiator volume for $\Delta T_{amb}$ between 10° C. and 80° C. Above 80° C., however, radiator sizing can be reduced significantly due to the increased driving force. It should be noted, however, that motor size must be increased to stay within the thermal limits.

The trends presented in the initial sizing study generally hold true for various power levels due mainly to the fact that the power of an electric machine is substantially proportional to the volume of the machine. Also the trends hold true for other types of machine such as those that do not have a rotor heat source such as, for example and not limitation, an electric machine with an interior permanent magnet and switched reluctance.

The increased thermal conductivity of the windings, combined with the proposed advanced cooling technology, enables high heat transfer rates without reaching the thermal limits of the wire insulation. The increased effective thermal conductivity of the windings, utilizing thermally conductive epoxy as the filler material, provides the same order of thermal conductivity as the core. In addition, while most of the heat from the machine is transferred into the DWHX, some of the heat still travels to the frame. The increased thermal conductivity of the system, however, provides a reduced temperature drop from the windings to the frame. This results in drastically increased frame temperatures.

The frame temperatures from the case studies presented above were ~140° C., which exceeds the typical safe touch limit. This can nonetheless be easily addressed with, for example and not limitation, proper frame sizing (as discussed above), appropriate packaging, and materials. In traction drive automotive applications, for example, the DWHX electric machine may not be touch accessible, but may nonetheless be provided with a "hot surface" warning label, for example, to warn technicians during maintenance.

Embodiments of the present invention comprise a novel advanced cooling technique, or direct winding heat exchanger (DWHX) comprising an advanced heat exchanger placed proximate the winding bundles on the stator of an electric machine. This cooling technique can dramatically reduce the temperature and thermal resistance of the stator windings in many concentrated winding electric machines. Embodiments of the present invention can also comprise an integrated design model. The model can be used in conjunction with particle swarm optimization, or other analytical methods, to perform initial sizing for, for example and not limitation, electrical machines with integral radiator and infinite reservoir configurations. The system and method described herein provide dramatic improvements in both efficiency and torque density in a practically manufacturable cooling system.

While several possible embodiments are disclosed above, embodiments of the present invention are not so limited. For instance, while several possible configurations of materials for the cooling system have been disclosed, other suitable materials and combinations of materials could be selected without departing from the spirit of embodiments of the invention. In addition, the location and configuration used for various features of embodiments of the present invention can be varied according to a particular motor size or power requirement that requires slight variations due to, for example, the materials used and/or space or power constraints. In addition, the fitness functions described herein can be modified to optimize different design parameters (e.g., volume or mass) for use in different applications. Such changes are intended to be embraced within the scope of the invention.

The specific configurations, choice of materials, and the size and shape of various elements can be varied according to particular design specifications or constraints requiring a device, system, or method constructed according to the principles of the invention. Such changes are intended to be embraced within the scope of the invention. The presently disclosed embodiments, therefore, are considered in all respects to be illustrative and not restrictive. The scope of the invention is indicated by the appended claims, rather than the foregoing description, and all changes that come within the meaning and range of equivalents thereof are intended to be embraced therein.

What is claimed is:

1. A system for cooling an electric machine comprising a stator and one or more windings, the system comprising:
   one or more direct winding heat exchangers (DWHX) thermally coupled to the one or more windings and comprising:
      a coolant reservoir; and
      a plurality of micro-feature protrusions disposed inside the coolant reservoir;
   wherein the one or more DWHXs are configured to receive a coolant, and wherein the plurality of micro-feature protrusions are configured to be in thermal communication with the coolant to provide direct cooling to the one or more windings.

2. The system of claim 1, wherein the coolant reservoir comprises a meso-channel.

3. The system of claim 1, wherein one or more of the plurality of micro feature protrusions comprise a micro-hydrofoil.

4. The system of claim 1, wherein the plurality of micro-feature protrusions are arranged in a symmetrical array about the centerline of the coolant flow.

5. The system of claim 1, wherein the coolant reservoir is substantially prismatic, and the plurality of micro-feature protrusions are disposed on one or more of the major sides of the coolant reservoir.

6. The system of claim 1 further comprising a thermally conductive material disposed between the one or more DWHXs and the one or more windings for conducting heat there between.

7. The system of claim 6 wherein the thermally conductive material is a thermally conductive epoxy.

8. A direct winding heat exchanger (DWHX) for cooling an electric machine, the DWHX comprising:
   a coolant reservoir having an inlet and an outlet; and
   a plurality of micro-feature protrusions disposed within the coolant reservoir;
   wherein the DWHX is configured to cool one or more windings of the electric machine.

9. The DWHX of claim 8, wherein the plurality of micro-feature protrusions are airfoil shaped.

10. The DWHX of claim 8, wherein the plurality of micro-feature protrusions are arranged in a symmetrical array.

11. The DWHX of claim 8, wherein the plurality of micro-features are arranged in a staggered array.

12. The DWHX of claim 8, wherein the inlet is configured to provide a coolant to the coolant reservoir.

13. The DWHX of claim 12, wherein the outlet is configured to enable a coolant to exit the coolant reservoir.

14. The DWHX of claim 8, wherein the coolant reservoir comprises one or more major sides and the plurality of micro-feature protrusions are disposed on the one or more major sides.

15. The DWHX of claim 8 further comprising a dove-tail joint for detachably coupling the DWHX to a substantially non-conductive bulkhead.

16. The DWHX of claim 8, wherein the coolant reservoir comprises a meso-channel.

17. A method for designing a direct winding heat exchanger (DWHX) for cooling an electric machine, the method comprising:
evaluating an efficiency of a plurality of micro-feature array geometries to optimize a micro-feature array density;
determining a pump size to minimize pumping loss and maximize cooling capacity of the DWHX; and
selecting one or more design parameters to determine one or more dimensions of the DWHX.

18. The method of claim 17 wherein the design parameters comprise DWHX thickness, a wall thickness of the DWHX, and an ambient temperature.

* * * * *